United States Patent
Tsao et al.

(10) Patent No.: US 7,945,652 B2
(45) Date of Patent: May 17, 2011

(54) DISPLAY MULTI-LAYERS LIST ITEM IN WEB-BROWSER WITH SUPPORTING OF CONCURRENT MULTI-USERS

(75) Inventors: Sheng (Ted) Tai Tsao, San Jose, CA (US); Ying (Sarah) Zou, San Jose, CA (US)

(73) Assignee: Sheng Tai (Ted) Tsao, San Jose, CA (US)

( * ) Notice: Subject to any disclaimer, the term of this patent is extended or adjusted under 35 U.S.C. 154(b) by 1568 days.

(21) Appl. No.: 11/374,302

(22) Filed: Jul. 2, 2004

(65) Prior Publication Data

US 2007/0198713 A1 Aug. 23, 2007

Related U.S. Application Data

(63) Continuation-in-part of application No. 10/713,905, filed on Aug. 12, 2002, now Pat. No. 7,379,990, and a continuation-in-part of application No. 10/713,904, filed on Aug. 6, 2002, now Pat. No. 7,418,702.

(51) Int. Cl.
*G06F 15/16* (2006.01)
*G06F 15/173* (2006.01)

(52) U.S. Cl. ......... 709/223; 709/203; 709/225; 709/226

(58) Field of Classification Search .................. 709/219, 709/223, 224, 225
See application file for complete search history.

(56) References Cited

U.S. PATENT DOCUMENTS

| | | | | |
|---|---|---|---|---|
| 5,748,896 A * | 5/1998 | Daly et al. | ................... | 709/223 |
| 6,182,116 B1 * | 1/2001 | Namma et al. | ................ | 709/204 |
| 6,664,978 B1 * | 12/2003 | Kekic et al. | .................... | 715/733 |
| 7,278,142 B2 * | 10/2007 | Bandhole et al. | ............. | 718/104 |
| 7,281,248 B2 * | 10/2007 | Demsey et al. | ................... | 718/1 |
| 7,448,079 B2 * | 11/2008 | Tremain | .......................... | 726/14 |
| 7,565,414 B1 * | 7/2009 | Love | ............... | 709/219 |
| 2001/0045965 A1 * | 11/2001 | Orbanes et al. | ............... | 345/841 |
| 2002/0069369 A1 * | 6/2002 | Tremain | ....................... | 713/201 |
| 2002/0095396 A1 * | 7/2002 | Frerking et al. | ................... | 707/1 |
| 2002/0186238 A1 * | 12/2002 | Sylor et al. | ..................... | 345/736 |
| 2003/0084128 A1 * | 5/2003 | Anderson et al. | ............. | 709/220 |
| 2003/0084151 A1 * | 5/2003 | Simpson et al. | ............. | 709/225 |
| 2004/0221290 A1 * | 11/2004 | Casey et al. | .................... | 718/104 |
| 2005/0120160 A1 * | 6/2005 | Plouffe et al. | ........................ | 711/1 |
| 2005/0246441 A1 * | 11/2005 | Chandrasekaran et al. | .. | 709/226 |

OTHER PUBLICATIONS

Sheldon, Bob and Wilansky, Ethan. Microsoft Windows 2000 Server. WA, Microsoft Press 2000 Whole Book ISBN 0-7356-0988-8.*
ESX Server 2 Administration guide[online]. VMWARE Corporation, 2003[retrieved on Apr. 28, 2010]. Retrieved from the Internet <URL:http://www.vmware.com/pdf/esx2_admin.pdf>.*

* cited by examiner

*Primary Examiner* — Rupal D Dharia
*Assistant Examiner* — Tom Y Chang

(57) ABSTRACT

This invention takes the course of evolution and creating a web based computer user work environment for a control management station and its associated systems on the network crossing Intranet, Internet or LAN. Therefore, users can access and manage the control management station and all its associated system through web browser on any other systems or devices. To establish a web based computer user work environment, the resources information on control management station and on associated systems on network need to be collected and convert them to standard structured format for web based communication and further displaying them in web browser. These information need to be collected by control management station at its and the associated systems' boot up time or at the time when a user logins and requests to access and manage these resources.

61 Claims, 20 Drawing Sheets

A Typical CCDSVM with Multiple Clients (two data paths)

Fig. 1: A Typical CCDSVM with Multiple Clients (two data paths)

Fig. 2 a) A degenerated CCDSVM with a control system station only

Fig. 2, b) The CCDSVM with identical system unit and client host

Fig. 2, c) CCDSVM for non-web based client access and web-based management

Fig. 3) The Software of WCUWE for typical CCDSVM:

Fig. 4: Examples of Multi-Layer Items List:
a)
b)
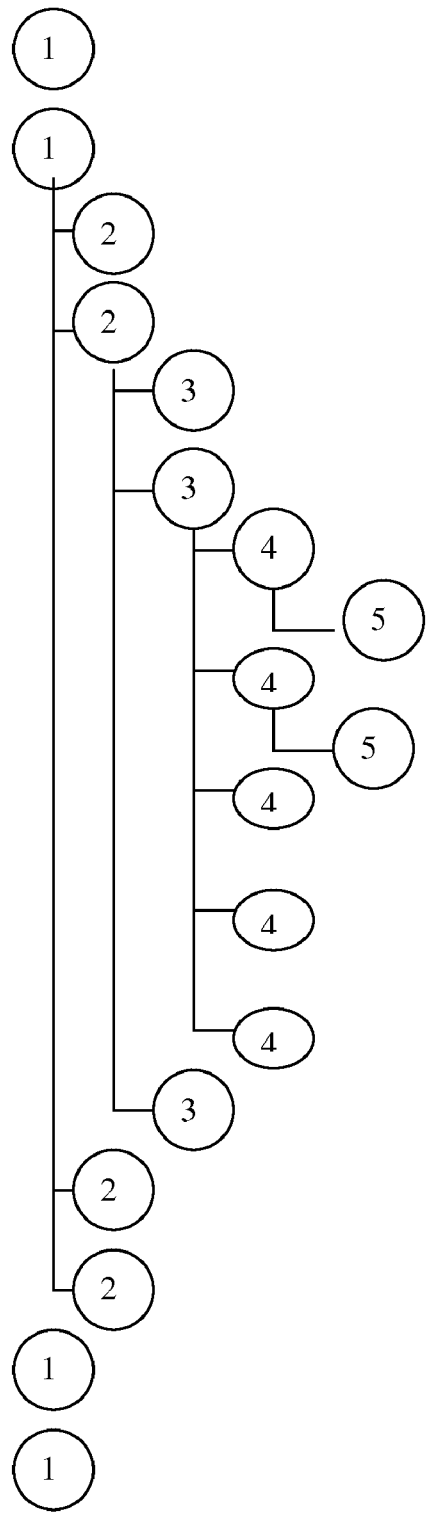
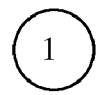
Fig. 4

Fig. 5, the web based operation menu of WCUWE of CCDSVM
a) Web based drop down menu for disk operation.
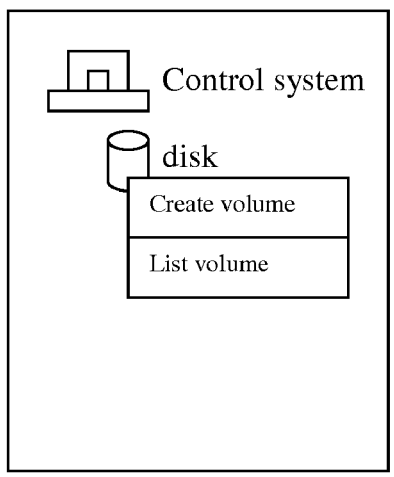
b) Web based selective menu for selecting an system unit:
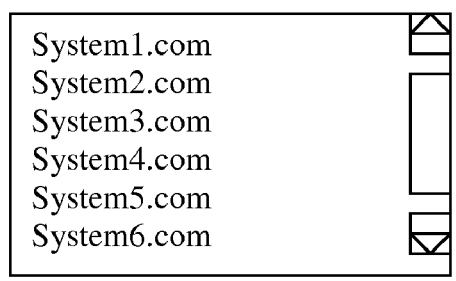

Fig. 6: Examples of web based operation menu for different type of node on MLIL.
  a) Shows an operation menu to manage the storage (disk).
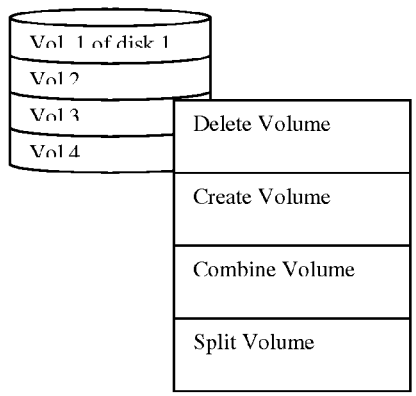
  b) Shows an operation menu to manage the file folders.
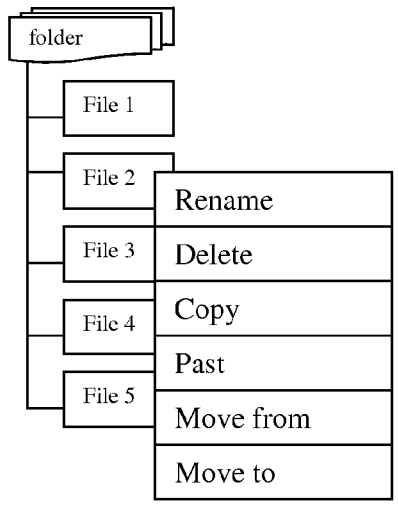

c) Shows an web based operation menu to manage the system unit on network.

Fig. 7: An example of system units automatically and dynamically grouped by group ID.
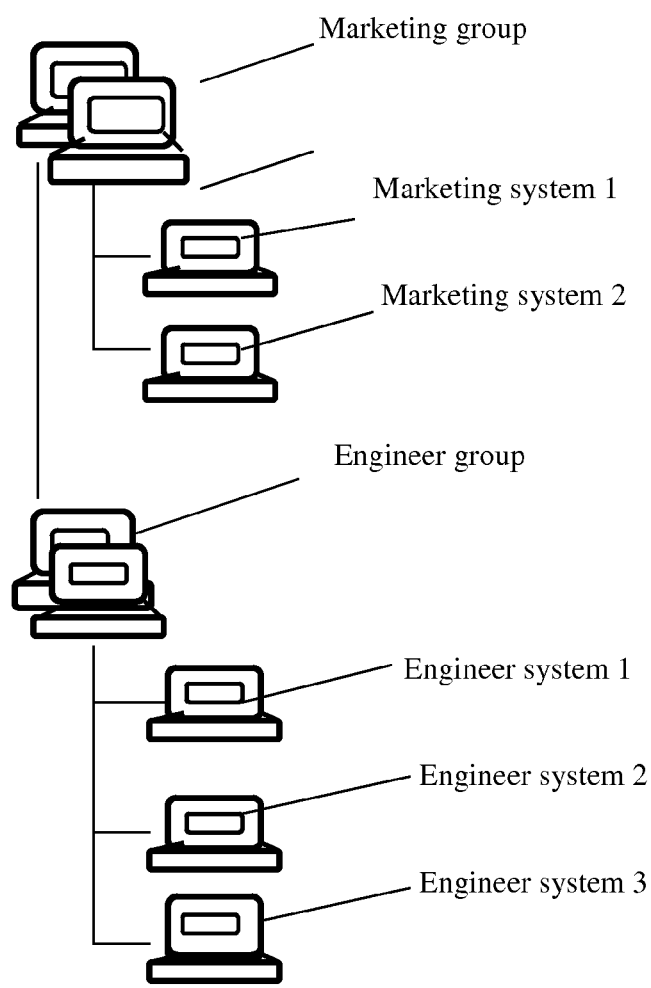

Fig. 7B
Virtual Service Pool Automatic Configuration Protocol
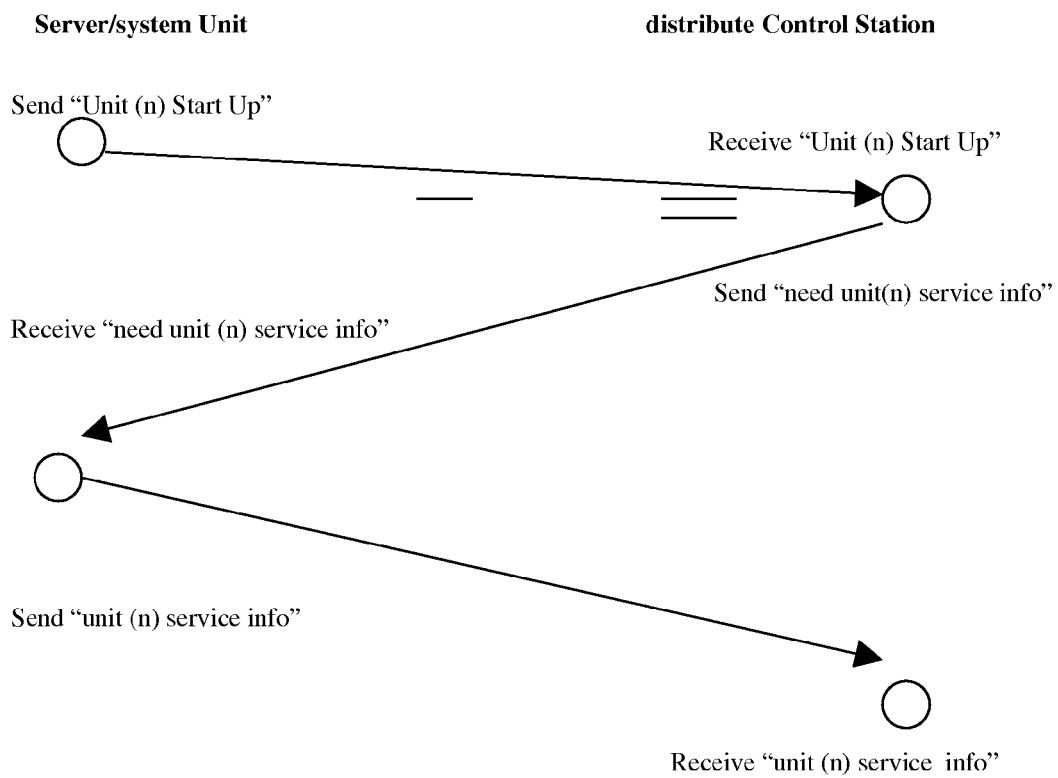
Fig. 7B

Fig. 7C

The UDP packet format used by "Virtual SAN Auto Configuration Protocol"

| Source IP address |
| --- |
| Destination IP address |
| Source port |
| Destination port |
| Message Type |
| Data Length |
| Data Area |

Fig. 7C

Fig. 8: An example of MLIL combined with mixed devices, system units and groups.
  a) This example shows the top level of MLIL is system group, the second level is system unit, the third level is device of disks.
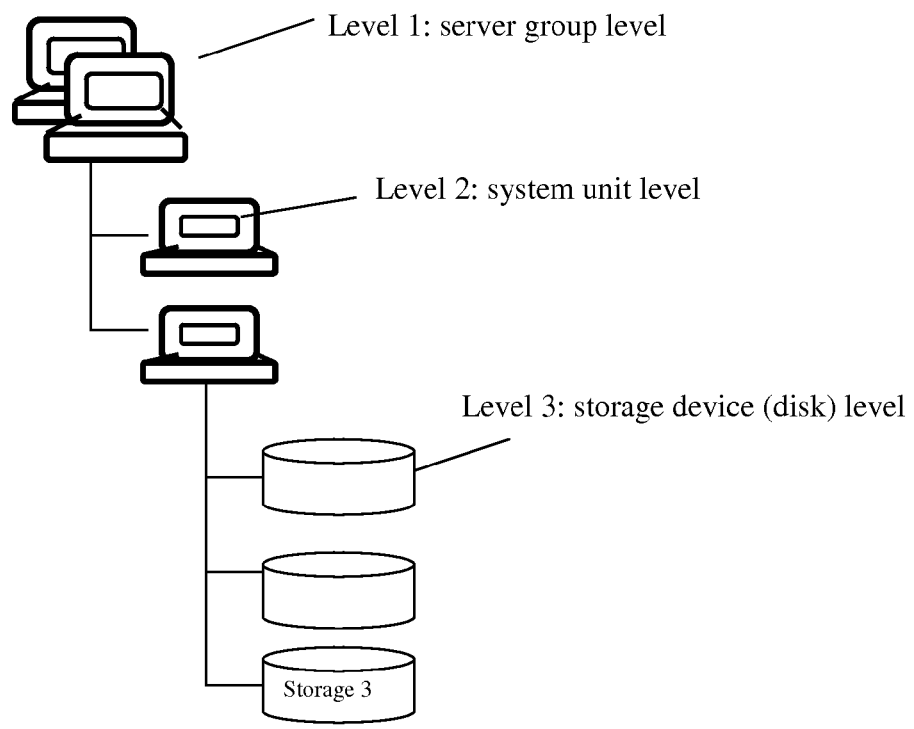

b) This example shows the top level of MLIL is system group, the second level is system unit, the file folder and files start from third level.

Fig. 9: This figure illustrated an example of how does the file system on system unit in a group can be accessed. (an WCIAWE of CCPSVM)

Typical Computer system connected to a network environment

Fig. 11A and Fig. 11B
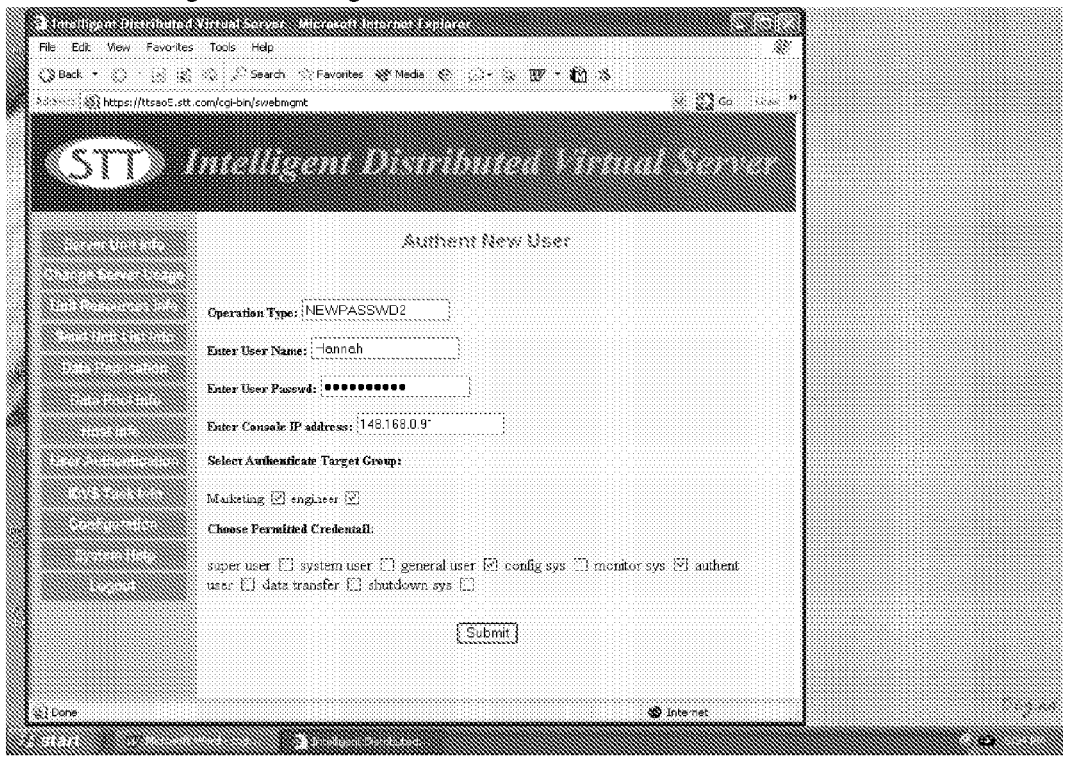
Fig. 11A
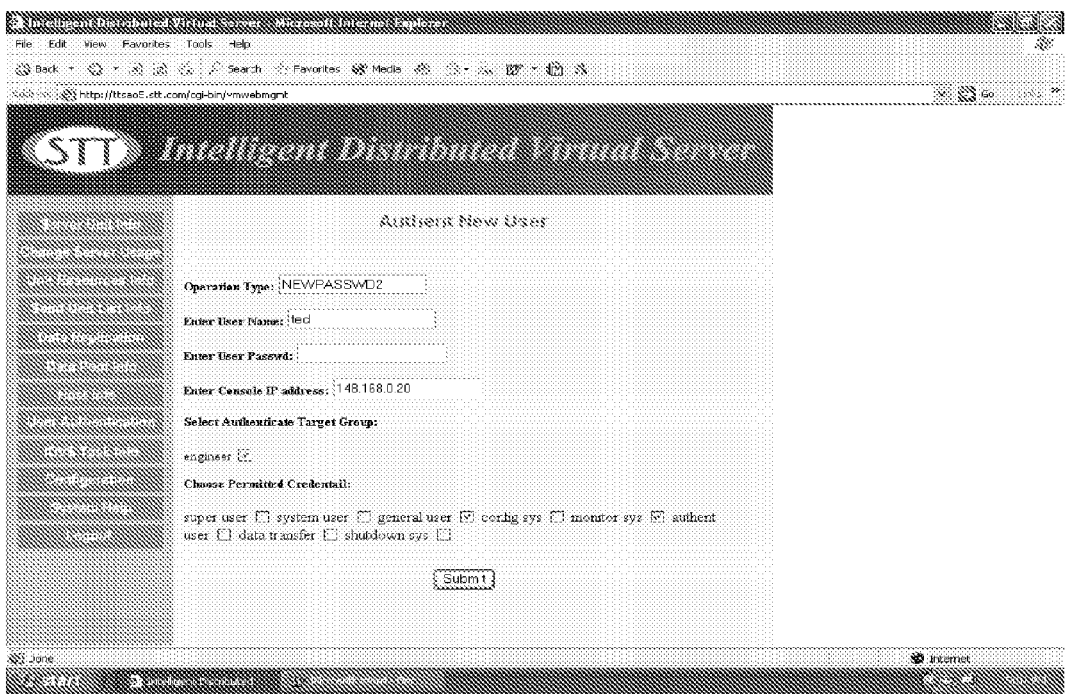
Fig. 11B

Fig. 11C and Fig. 11D
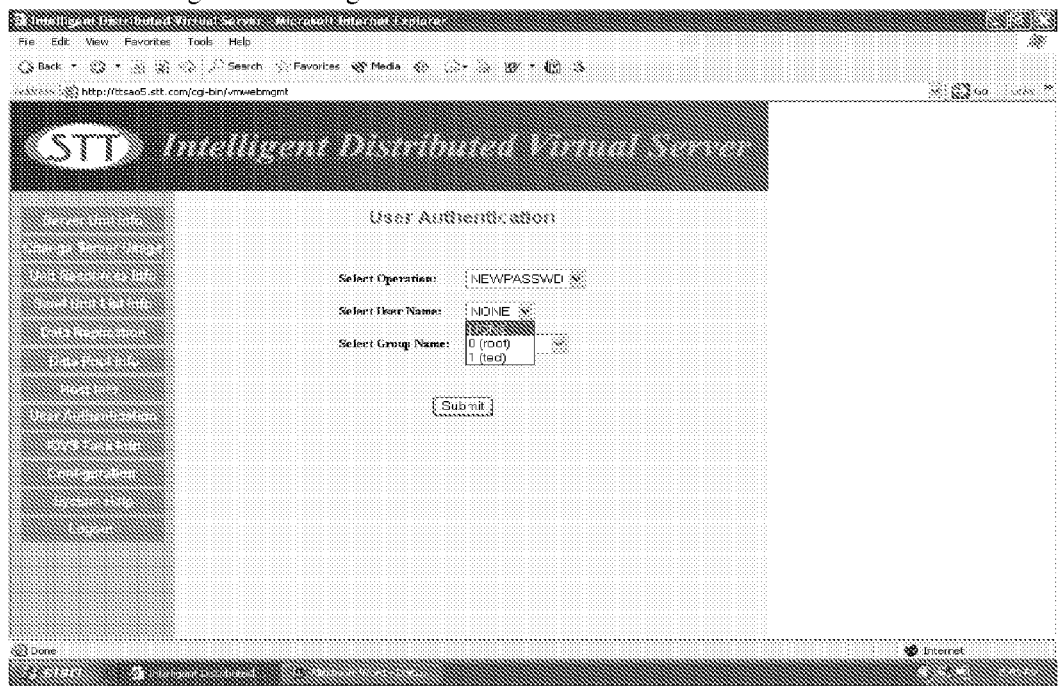
Fig. 11C
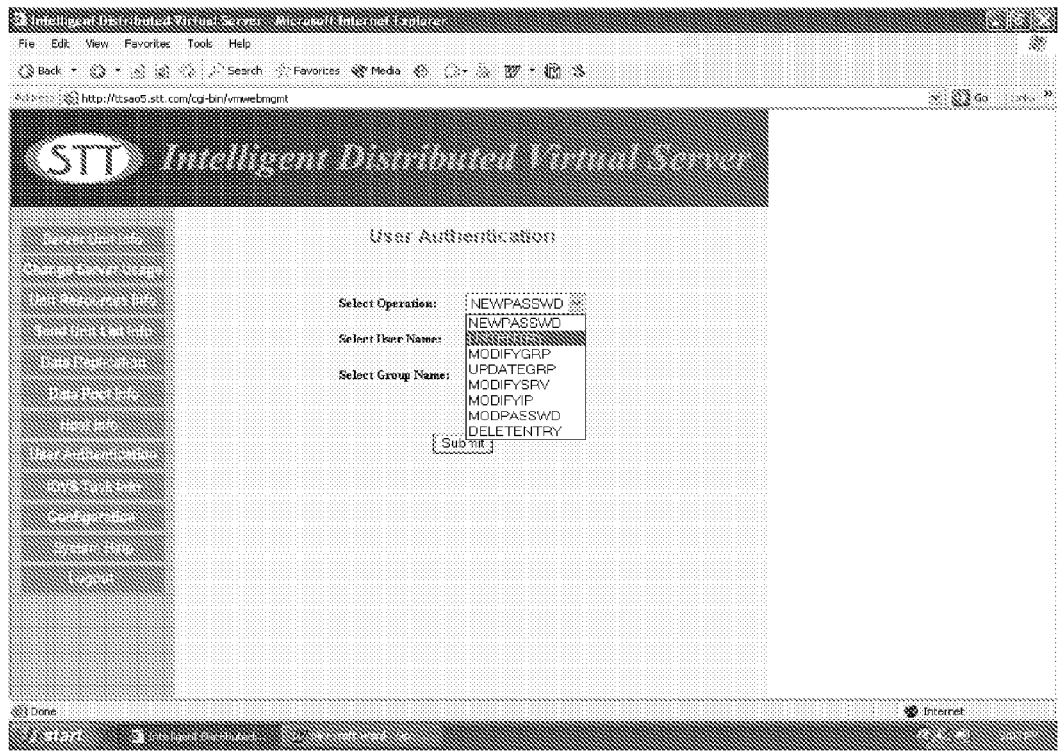
Fig. 11D

Fig. 11G & Fig. 11H
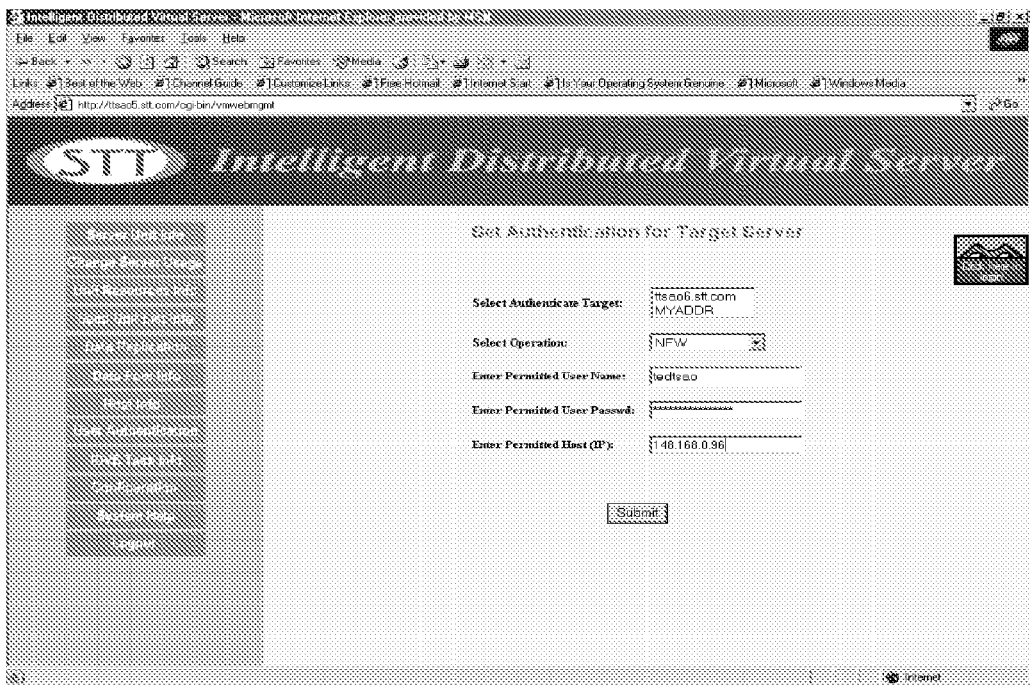
Fig. 11G
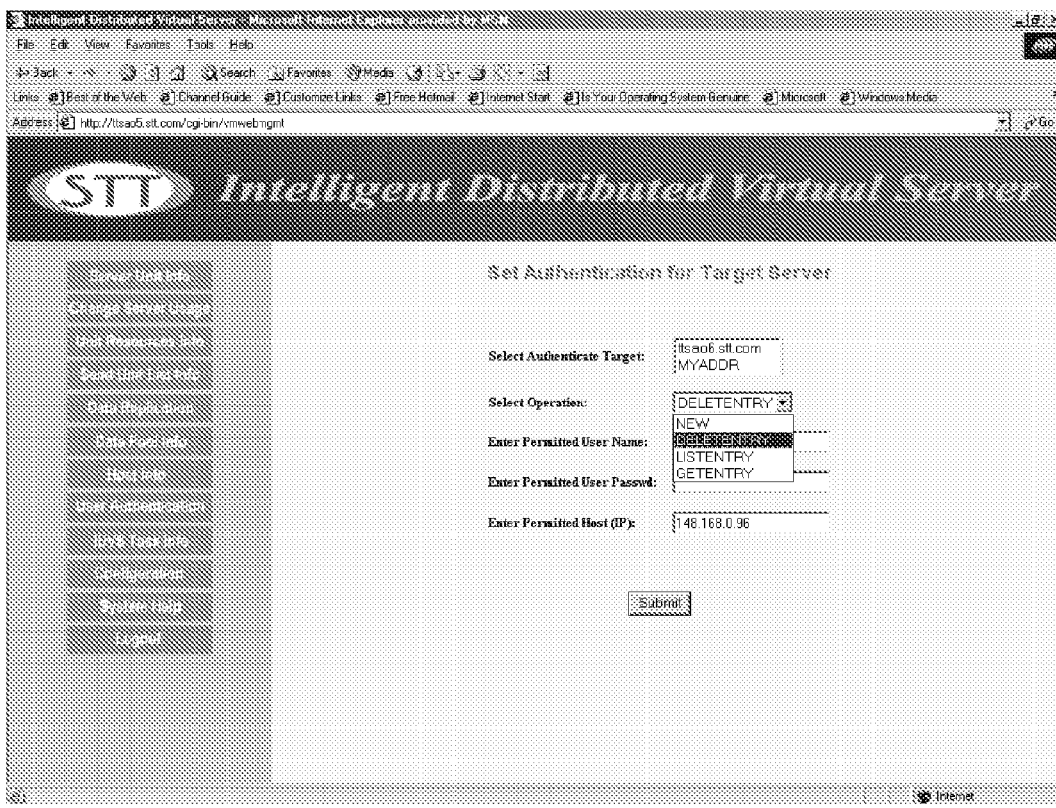
Fig. 11H

DISPLAY MULTI-LAYERS LIST ITEM IN WEB-BROWSER WITH SUPPORTING OF CONCURRENT MULTI-USERS

PRIORITY

This application is the continuation-in-part of U.S. patent application Ser. No. 10/713,904, filed Aug. 6, 2002, now U.S. Pat. No. 7,418,702 filed in the name of the same inventor and entitled "Concurrent Web Based Multi-Task Support for Control Management System" and is a continuation-in-part of U.S. patent application Ser. No. 10/713,905 filed Aug. 12, 2002, now U.S. Pat. No. 7,379,990, filed in the name of the same inventor and entitled "Method and Apparatus for web-based Storage On Demand".

FIELD OF THE INVENTION

The present invention focuses on providing multiple concurrent users from each of their web browser interacting in web-based computer user work environment ("WCUWE") with ability of displaying, viewing, accessing & operating various resources of the computer systems by using multi-layered item lists ("MLIL") for a central controlled distributed scalable virtual machine ("CCDSVM").

BACKGROUND OF THE INVENTION

The evolution of the computer user interactive work environment has changed from paper tape or punch cards of early years to command line based user work environment on a native system in 1970's, and to window & mouse click based user work environment on a native system in the middle of the 1980's.

There are network based user work environment since 1980's and 1990's such as Microsoft's terminal service, the telnet of Unix & Linux system etc. These types of software let users to access and operate the target system remotely from the user's local system. There are network management software, which mostly focus on monitoring the targeted systems' network activities. In addition, all of the software mentioned has limited mobility and capability because they are all required to install specialized software on the user's remote system. Therefore, these types of software are not easy to be ported and further limit the user's ability to remotely work from various kind systems or devices.

There are web-based application software that allow users to access web applications on a web server from a web browser on a user's local system or device. However, these types of software are not designed for manage resource on web server and not designed for creating a web based computer user work environment. There are web-based software that allow people to manage system remotely. However, they also do not create a web-based computer user work environment, instead, simply dump the existing computer user work environment of a particular system to a web browser on a remote system. Also, this type of software has limited network capability.

A new web-based computer user work environment (WCUWE) has been disclosed in the parent applications of the "Concurrent web based multi-task support for control management system", and the "IP based distributed virtual SAN" in the name of the same inventor. The present invention will continue to discuss how the WCUWE of the CCDSVM can achieve and realize a flexible working environment for the users of the CCDSVM by deploying the MLIL. With the MLIL, the WCUWE can provide users much efficiency to access and operate the provisioned systems of the CCDSVM from any web browser on the user's local system or electronic device. Due to the capability of expanding the CCDSVM crossing Intranet and Internet and its strong security control, the WCUWE can meet the increased demanding for providing a more secure, mobilized, flexible and cost saving computational solution.

To fully understand the present invention, one might also need to know the various terminologies from technology perspective, which are described hereafter.

The CCDSVM is an abbreviation for a central controlled distributed scalable virtual machine. The CCDSVM allows a control management station to control groups of systems and provide distributed services to one or more client systems in Intranet and Internet as well as in LAN environment. The software components of the CCDSVM form a virtual operating environment of a virtual operating system.

Every computer system provides each end user a computer user work environment (CUWE), which usually runs on the top of a generic computer operating system kernel. The CUWE allows privileged user to setup authentication profile for different users, to configure system resources from storage, network, file system, file folders structure, files and all other available resources on the computer system, to monitor system activities, to access applications, and to manage data files such as moving data from one folder to another folder or moving data from one system to another system etc. without limits. Specially, the CUWE provides each of one or multiple concurrent users having multi-task capability. Therefore, each user is capable of performing multiple tasks described above concurrently after a successful log on to a computer system.

The web-based computer user work environment (WCUWE) of the present invention runs on the top of generic operating system for a single computer or for multiple computers of a virtual server. The WCUWE allows each users working on one or multiple computer systems through a conventional web-browser, which either located remotely on a system or device such as laptop, PDA, desktop etc. or located locally on said one or more computer systems. With this web-based computer user work environment, the entire CCDSVM can be operated as a single machine.

The resources configured on a computer system or electronic device include CPU, memory, storage device, network device, monitor or other display devices, keyboard, mouse, photo or video record devices, wireless device, user authentication profiles, and various form of deposited data on storage etc. without limits. The deposited data on storage could be file system structure, file-folders, data files, formed raw data etc. The data file can be in various format such as plain text, binary data, PDF, MPEG or jpeg, or various image data, MS power point or Word documentation etc. The mentioned data is for illustrating only and they shall not be limited to these mentioned above. The storage could also be in any media format such as hard disk drive, magnetic tape drive, various forms of memory devices, or others suitable media without limits. In addition, in the rest of discussion the resources of the computer system or devices will be referred to the resources mentioned above.

The web browser can interpret the standard structured formatted information and display them via web pages such that people can view, manipulate, and interact with the displayed information. The standard formatted information are imposed and encoded by using the programming language such as HTML (hypertext markup language), XHTML, DHTML, XML, or any other suitable languages, whichever can best describe the structured information. In the real life, the mentioned languages (HTML, XML, . . . ) themselves are often referred as standard format for web communication. Therefore, in this invention, it is not necessary to have a clear boundary between these two different entities. In other words, they are often be used interchangeably in this invention without further mention the differences.

Multi-layered item list (MLIL) is a logically organized information list with a certain order, where each entry contains an item and each items may contain another layer of list of items, where each items may represent a physical resources or information of the computer systems or other devices. For example, the information of files and file-folders of a file system on a modern computer system is typically organized as multi-layers item list and can be viewed, displayed & operated on a modern UI window of a native computer system with supporting from modern computer operating system. Further, each item (node) on the list may represent a file-folder or file.

The information of systems or devices on the network, the information of hardware components on a systems such as disks, network cards, memory etc, and the information of multiple users' accounts on a system also can be organized into multiple layers of item list for displaying, viewing, and operating. The supporting of the MLIL in the WCUWE has made the system resources and information much easy to be displayed, viewed, and operated from a browser. The MLIL may contain at least one item (node) and as many as multiple hundreds items (nodes).

The system, which mentioned in present invention, can be a desktop, laptop, various types of servers, PDA, or cell phone or other devices with communication ability. The systems mentioned here are just for illustrating and they shall not be limited in the present invention.

The OS (operating system) mentioned in this invention can be any suitable operating system such as Windows, Linux, various Unix, real-time operating system and so forth without limits. The present invention shall be independent of the OS platform.

The programming languages, which are used for implementing all software modules mentioned in this invention, could be any suitable languages or a combination of the suitable languages such as C, C++, Java, JavaScript, Visual Basic, C sharp, HTML, XML, DHTML, XHTML, and others without limits.

The communication protocols used in the CCDSVM could be various kinds that are appropriate for transmitting required data over communication links. The communication protocols could be IP-based protocols or non-IP-based. The IP based protocols are built on the top of IP protocols and could be standard based, such as TCP, UDP, ICMP, and other protocols, and also can be non-standard proprietary protocols. The non-IP based protocols can be ISO 8473, ISO 8208, or serial communication, or data link layer protocols like LLC 802.2, or HDLC, or any proprietary protocols bellow the IP protocol level. The protocols mentioned above are just for illustration purpose and shall not impose any limitations on the present invention.

The communication protocols for web computing could be HTTP, SOAP, WAP, or others without limitations.

The web browser mentioned in this invention can be an existing commercial software such as Microsoft IE or Netscape, or Firefox, or Mozillar, or any other commercial or proprietary software. The web browser must be able to handle web protocols such as HTTP, SAOP, WAP or others and be able to interpret the standard structured formatted information, and further let user to view the web contents transmitted over the web using protocol such as HTTP.

The web server software mentioned in this invention could be a commercial software from any vendors such as Apache, IIS, or others on the market, and it also can be a proprietary software. The web server software must be able to handle web protocols such as HTTP, which is a protocol built on the top of the TCP protocol. Therefore, the structured information for the web can be transmitted to web browser through communication link if web browser and web server are located on different systems, or through inter-process communication if both web browser and web server are located on the same system.

A user session of a CCDSVM is normally started at a time the user log on to the CCDSVM from a web-browser and ended at a time when the user logout the CCDSVM from the same web browses. During a session, each user can perform tasks, which have been permitted by the credentials and permissions setup in user's security profile.

BRIEF DESCRIPTION OF THE FIGURES

FIG. 2a) illustrates an example of a CCDSVM with a single control management station.

FIG. 2b) illustrates an example of a CCDSVM with identical client systems and system units.

FIG. 2c) illustrates an example of CCDSVM with client (host) system for non-web based accessing.

FIG. 4: illustrates simplified examples of multi-layered item list (MLIL).

FIG. 4a) is a simplified diagram illustrating one embodiment of a multi-layered item list (MLIL), where each node on the (MLIL) at a different layer may represent an associated resource.

FIG. 4b) is a simplified diagram illustrating one embodiment of a multi-layered item list (MLIL), which consists a single node on the (MLIL).

FIG. 5: illustrates the examples of the operation menu for the WCUWE of the CCDSVM.

FIG. 5a) is a simplified diagram illustrating one embodiment of a web-based disk operation menu associated with a disk drive.

FIG. 5b) is a simplified diagram illustrating one embodiment of another type of web-based operation menu that can be used for selecting a system for further accessing.

FIG. 6a) is a simplified diagram illustrating one embodiment of a web-based operation menu designed for managing a storage node of an storage volume MLIL.

FIG. 6b) is a simplified diagram illustrating one embodiment of a web-based operation menu for file and file folder management of an file-folder MLIL.

FIG. 6c) is a simplified diagram illustrating one embodiment of a web-based operation menu associated with a MLIL with three nodes and two levels for managing a layered group of system units.

FIG. 7: illustrates an example of multiple server units being grouped into two groups based on group ID.

FIG. 8a) is a simplified diagram illustrating one embodiment of displaying a web based 3 layers MLIL for a system group, its next layer of provisioned system units and a system unit's next layer of configured storage devices.

FIG. 8b) is a diagram illustrating one embodiment of displaying a web-based 4 layers MLIL for a system group, its next layer of provisioned system units, a system unit's next one or more layers of files & folders.

in the drawing, like elements are designated by like reference numbers.

BRIEF DESCRIPTION OF THE INVENTION

The parent application, of the "concurrent web based multi-task support for control management system", discloses the web-based computer user work environment (WCUWE) and the multi-task support in the WCUWE. The parent application, of the "IP based distributed virtual SAN" discloses how can the system units of the CCDSVM be automatically and dynamically provisioned and grouped to form one or multiple various service pools in cross network domain environment. With the WCUWE, the entire CCDSVM can be accessed and managed from web-browser anywhere on the network. In addition, it permits multiple users, each from their own web-browser on the user's local system or device over the network concurrently access and manage the CCDSVM with multi-tasking capability.

Since the emergence of the native window based computer user work environment (CUWE) in middle of 1980's, users are able to interactively display, view and operate the information and resources of the computer systems or devices by mouse-click through corresponding displayed multi-layered item list such as files & folders list on MS Windows system, etc. In other words, supporting multi-layered item list has become a critical part of the native window based computer user work environment. Specially, with the new WCUWE for the CCDSVM, how to provide multiple concurrent users from each of a single web-browser to effectively simultaneously display, view & operate item list for corresponding resource such as for deeply nested files & folders, or for multi-groups provisioned systems or devices etc. has became an unprecedented challenge. The two parent applications mentioned before and together with present invention have successfully solved this challenge.

These and other features, aspects and advantages of the present invention will become understood with reference to the following description, appended claims and accompanying figures.

Detailed Description of the Drawings

Figure 1:
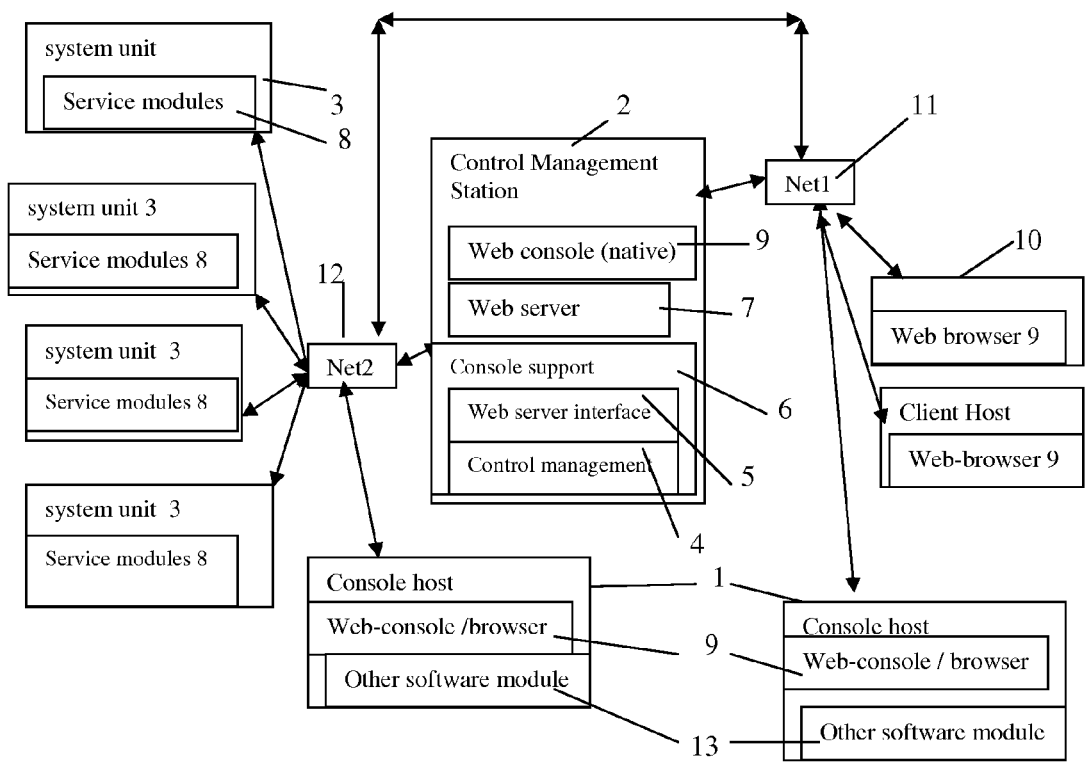
FIG. 1: illustrates an example of a typical CCDSVM with a control system, multiple console hosts, system units and client systems.

FIG. 1: illustrates an example simplified block diagram for an embodiment of a typical CCDSVM, which includes the following:

A)

The console hosts 1 which can be any types of system on the network and have suitable OS running, where each console host 1 must have a web browser 9 to be used for accessing and operating the CCDSVM. The web-browser can be implemented with any suitable or a combination of suitable programming languages. Web-console is another name for the web-browser 9 on the console host 1. From the web browser 9 of the console host 1 by following a web URL, users can access the web pages for the WCUWE of the CCDSVM, and further to access, manage and operate the systems of the CCDSVM. The term of the web-console used instead of using the term of web browser due to it is specially designed for permitted privileged user with ability to access system information and perform system operation in the CCDSVM environment.

The console host 1 may also include other software modules 13, which may be implemented with any suitable programming languages. The software modules 13 may communicate with the control management station 2 using IP based, non-IP based, or any suitable protocols for receiving or sending data between the console host 1 and the control management station 2.

To support a non-web-based networked console, the software modules 13 of the console host 1 must handle protocol other than web protocol of the HTTP, SOAP, WAP or others for communicating with the console supporting software 6 of the control management station 2. The console host 1 plays same role as client system 10 except it is dedicated for system administrator to manage the CCDSVM.

The control management station 2 could be any type of system connected to the network and have any suitable OS running. The control management station 2 includes web server software 7 and console supporting software modules 6. The console supporting software modules 6 includes web server interface software modules 5 and control management software modules 4. The control management station 2 may also have a native web browser 9 to be used as a web-console 9 of the control management system 2. The web server software 7 sends data to and receives data from the web-console 9 of the console hosts 1 or the web-browser 9 of the client 10 using protocols such as HTTP or any other suitable protocols for delivering web contents.

The web server software 7 and the console supporting software 6 can be implemented with any suitable or a combination of the suitable programming languages. In addition, the communication protocol used between the console support software 6 and the service software modules 8 of the system units 3 could be any suitable protocol. In addition, the web server interface 5 of the console support software 6 may be extended to provide service that is same as the web server 7 can provide. In this case there is no need for the specialized web server 7 software.

System unit 3 could also be any type of systems and can have any suitable OS running. The system unit 3 contains service software modules 8, which is capable of communicating to other systems on the network. For example, the service software modules 8 of the system unit 3 can communicate with the control management software 4 of the control management station 2 to carry out the requested tasks for viewing or operating the resources of the system unit 3. The service software modules 8 of the system unit 3 also can communicate with each client system 10 for delivering the services to one or more client systems 10, or communicate with another system unit 3 for transferring data etc. without limits.

The service software modules 8 of the system unit 3 may include an individual software module dedicated to handle HTTP protocol or other web protocols if there is needs for performing web-based communication with the client system 10 or with other system unit 3 or with the control management station 2. This individual software module could be the commercial web server software on the market or a proprietary software. The service software modules 8 could also be implemented with any suitable programming languages, and be configured with any suitable communication protocols.

The net1 11 is a network infrastructure of Internet or Intranet, or LAN, which provides various communication links between the control management station 2 and the console-host 1 or the client system 10. It also provides communication links between the system unit 3 and the client system (host) 10. The net1 consists connection media such as cable (Ethernet, Optical Fiber, and other), wireless media for wireless link, or data bus on the circuit board; the net1 also consists of communication equipment including switches/routers/adapters, etc. and all other possible elements for communication without limitation.

the net2 (12) is also a network infrastructure of Internet or Intranet, or LAN, which provides communication links between the control management station 2 and the system units 3 or the consoles host 1. It also provides the communication link between the system unit 3 and the client system (host) 10. The net2 consists similar network equipment and elements that net1 11 has.

The client systems 10 are not part of the CCDSVM yet with permission and authorization, each client system 10 can get services from the CCDSVM, in one embodiment using web-browser 9. The web-browser 9 of the client system 10 could be either a conventional commercial browser on the market or a proprietary software, which provides compatible functionality to handle and interpreter data on the web.

there are 4 basic data flow paths within a typical CCDSVM configuration and they are listed bellow:

Data path 1 is the data flow through communication link between the web browser 9 of the client system 10 or the console host 1 or the control management station 2 and the web handling software of the web-server 7 and console support software 6 of the control management station 2. With this path of data flow, whenever a user sends a request of accessing a resource of the CCDSVM from the web-browser 9, the request is transmitted to the web-server module 7 and further down to the console support software modules 6 of the control management station 2. The console support software 6 collects all required information from the targeted system and converts them into the standard structured information for web communication. The targeted system could be any system unit 3 or the control management station 2 itself.

The resources information collected by the console support software 6 of the control management station 2 could be system status, storage information, network information, user authentication profile, file system information and files & folders information on the targeted system without limitations. The console support software 6 then passes this converted structured information to the web server software 7 and further transmits to the web-browser 9 through communication link net1 11 or net2 12 such that it can be displayed and viewed from a conventional web browser 9.

the communication protocols used between the web-browser 9 and the web server 7 of the control management station 2 could be the HTTP or any other suitable protocols for web communication, which could successfully transmit the data on web.

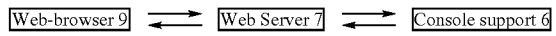

The data path 2 is the data flow through communication link between the control management station 2 and the system units 3. With this path of the data flow, the requests targeted for system units 3 are passed from the console support software 6 of the control management station 2 to the service modules 8 of the system unit 3 through communication link net2 12. If the responses for those requests must return back to the control management station 2, the service modules 8 of the system unit 3 carry out the requested task and then send the response back to the console support software 6 of the control management station 2. The communication protocol used between the console support software 6 of the control management station 2 and the service modules 8 of the system unit 3 can be any suitable protocols for transmitting data between them. The typical data flow through this path could be the boot message or system status or network information or storage information of the system unit 3 and so forth without limits.

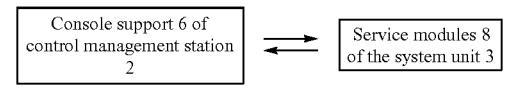

The data path 3 is the data flow through communication link between the system units 3 and the client systems 10 or the console hosts 1. With FIG. 1, in one embodiment, the console support software 6 of the control management station 2 may present a web link, which is pointed to an object of a system unit 3, and to be displayed into the user's web-browser 9 of the client system 10 or the console host 1 or the control management station 2. The object pointed by the web link on the system unit 3 could be a file of text, MPEG video, PDF, MS power point or Word documentation etc. Without limits, and it also could be a link of another web service program. From the web browser 9, user can directly access the information on any system unit 3 pointed by the web link without go through the control management station 2 again if the web browser 9 is not local to the control management station 2. In this case, the service modules 8 of the system unit 3 must also include a web server software to directly support the web browser 9 access as mentioned before.

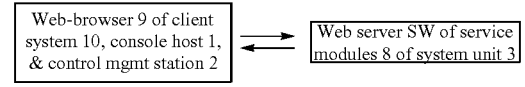

The data path 4 is the data flow through communication link between the system unit 3 and another system unit 3. With this path, the service modules 8 of a system unit 3 can directly transmit data or information to the service modules 8 of another system unit 3 via the communication link net2 12 without going through the control management station 2. The communication protocol between the system units 3 could be IP-based or any suitable non-IP-based protocol. The data and information transmitted through the path 4 can be various types, such a data file. For example, an user on the web-browser 9 may walk through a file folder on a system unit 3. Later, the user selects to transfer a file from the current system unit 3 to another targeted system unit 3 by mouse clicking, therefore, the data file will be transferred directly between two system units 3 without go through the control management station 2 again.

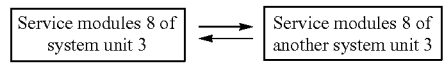

Figure 2:
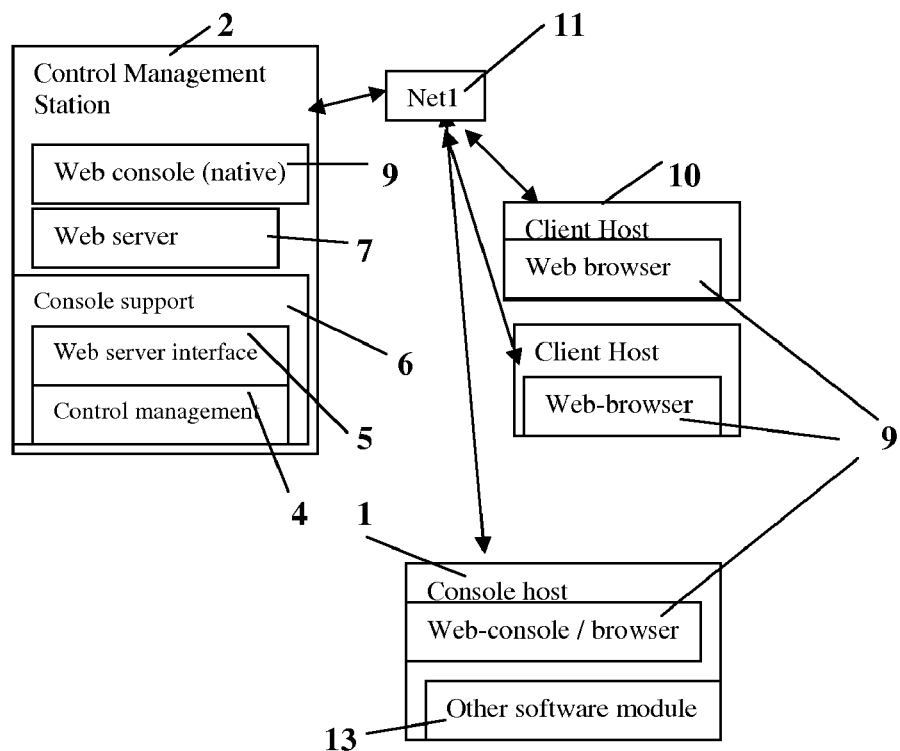
FIG. 2: illustrates the variations of the CCDSVM.
Figure 2:
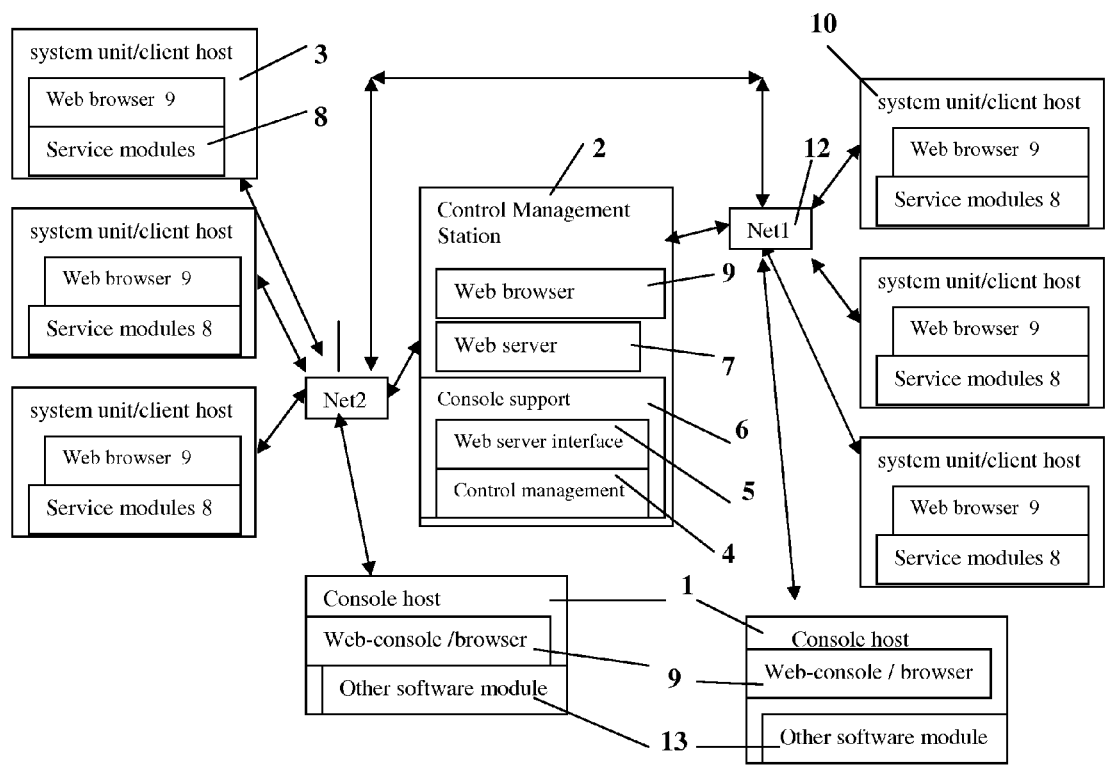
Figure 2:
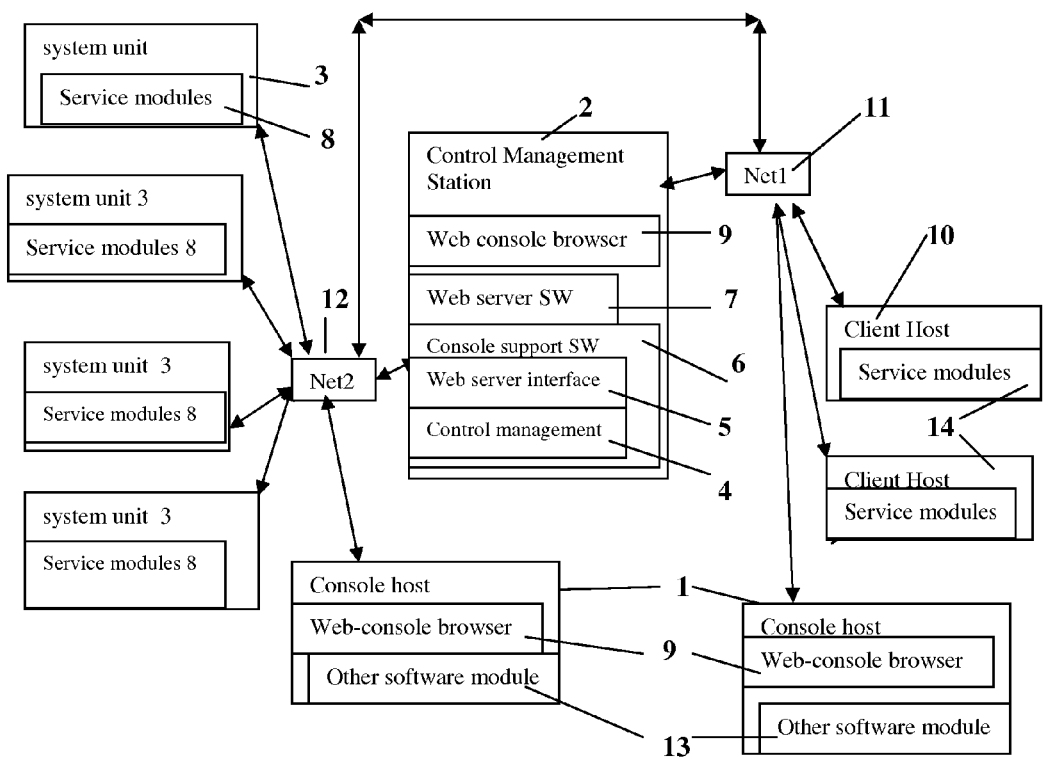

FIG. 2. A illustrates an example of another model of the CCDSVM that only has a single control management station 2. With this model, there is no any system unit 3 connected, therefore, the CCDSVM is degenerated into a single standalone system and the WCUWE just works fine for a single system, which is the control management station 2. Therefore, the user from the web-browser 9 of the console host 1 or the client host 10 or the control management station 2 can access and operate the entire resources on the control management station 2.

FIG. 2b illustrates an example of the CCDSVM with the identical client system 10 and system unit 3. This model is exact the same model with the typical CCDSVM that being shown in FIG. 1, except there is no difference between client system 10 and system unit 3 since each system unit 3 also configured with a web-browser 9 and each client system 10 is also configured with service modules 8. This means each system unit 3 and client system 10 shall play both roles of the system unit 3 and the client host 10 of FIG. 1. With this model, users from the web-browser 9 on each system unit 3 and client system 10 can login the control management 2 and further access & operate the resources of the control management station 2 or other system unit 3 and client system 10 with a security permission.

FIG. 2c illustrates another embodiment of the CCDSVM for non-web accessed by the client system 10. This model is the same model with a typical CCDSVM illustrated in FIG. 1, except that the client system 10 has its own service modules 14 used for non-web based access of using web-browser 9. For example, if a system unit 3 is a SAN unit providing storage volumes and the service modules 14 of the client system 10 is a driver routine for read data from and write data to a disk volume on the system unit 3. The client system 10 may also have a web-browser 9 to access the system unit 3 for the purposes other than for accessing disk volumes.

Figure 3:
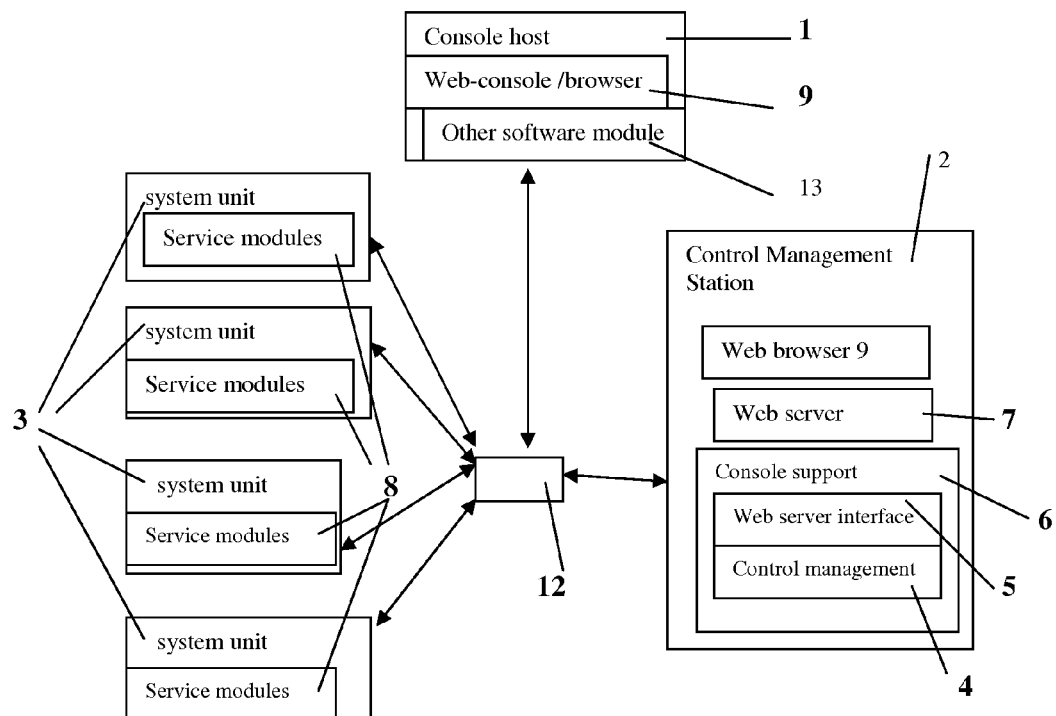
FIG. 3: illustrates an example of software modules of WCUWE for CCDSVM.

FIG. 3: illustrates an example of the software modules of the WCUWE for a typical CCDSVM. The software modules of the WCUWE can be implemented with any suitable or a combination of any suitable programming languages such c, c++, Java, Javascript, visual basic, HTML, XML, etc., which means that the software of the WCUWE is programming language independent.

The software modules of WCUWE may includes followings:
1) Web server interface modules 5 of the console support software 6 on the control management station 2.
2) Control management modules 4 of the console support software 6 on the control management station 2.
3) Web server software 7 on the control management station. The web server software 7 could be a commercial web server software on the marketing such as Apache or ms IIS or others, and also could be a proprietary software. If the web server interface modules 5 provide compatible functionality of the web server software 7, then web server software 7 is not needed.
4) Service software modules 8 on the system unit 3. Service software modules 8 may also consist of the web server software 7 or a software module, which can provide equivalent functionality as the web server software 7 can provide.
5) Web browser 9 on the console host 1 or on the control management station 2 or on the client system 10. The web browser 9 could be a commercial web browser on the market such as MS IE, or Netscape, and also could be proprietary software modules.

FIG. 4: illustrates an examples of the multi-layered item list (MLIL).

FIG. 4a) illustrates a MLIL that contains multiple nodes and multiple layers. A node on the MLIL can be expanded to display one or more sub-nodes by user interacting through mouse clicking on the node if there is any sub-nodes. The one or more sub-nodes may be reduced by the user interacting through mouse clicking on the same node again.

FIG. 4b) is a degenerated multi-layered items list, which contains a single node in a single layer.

FIG. 5 illustrates simplified examples of web operation menu for the WCUWE of the CCDSVM.

FIG. 5a) illustrates a web based drop-down menu for disk volume management. The drop-down menu can be invoked by right click an item (node) on the MLIL.

FIG. 5b) illustrates a web based selective menu for system unit management. The item of a specific system unit can be selected and a user can further click the submit button for submit a requested task.

Figure 6:
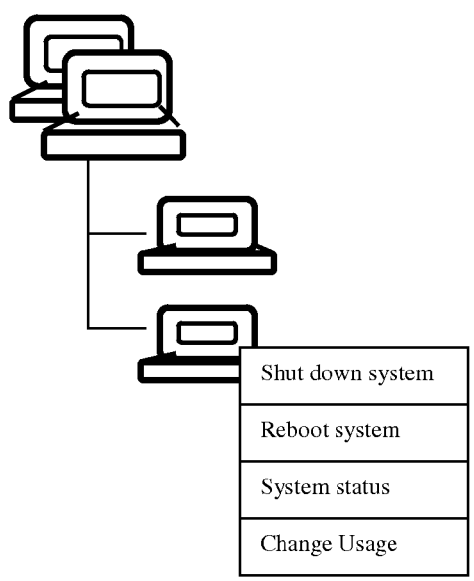
FIG. 6: illustrates the examples of operation menu for different type of node on MLIL.

FIG. 6. illustrates the simplified examples of the web operation menu for the different types of nodes on the MLIL.

FIG. 6a) illustrates an operation menu for managing a storage (disk) node.

FIG. 6b) illustrates an operation menu for managing each file node.

FIG. 6c) illustrates an operation menu for managing each system unit nodes of the CCDSVM on the network.

FIG. 7 illustrates an example of system units that are grouped based on group ID.

This figure demonstrates an embodiment of the MLIL that five system units are divided into two groups, which are the marketing group and engineer group. The marketing group contains 2 system units 3 while the engineer group contains 3 system units 3. The groups are automatically and dynamically formed during each system units booting up.

Figure 8:
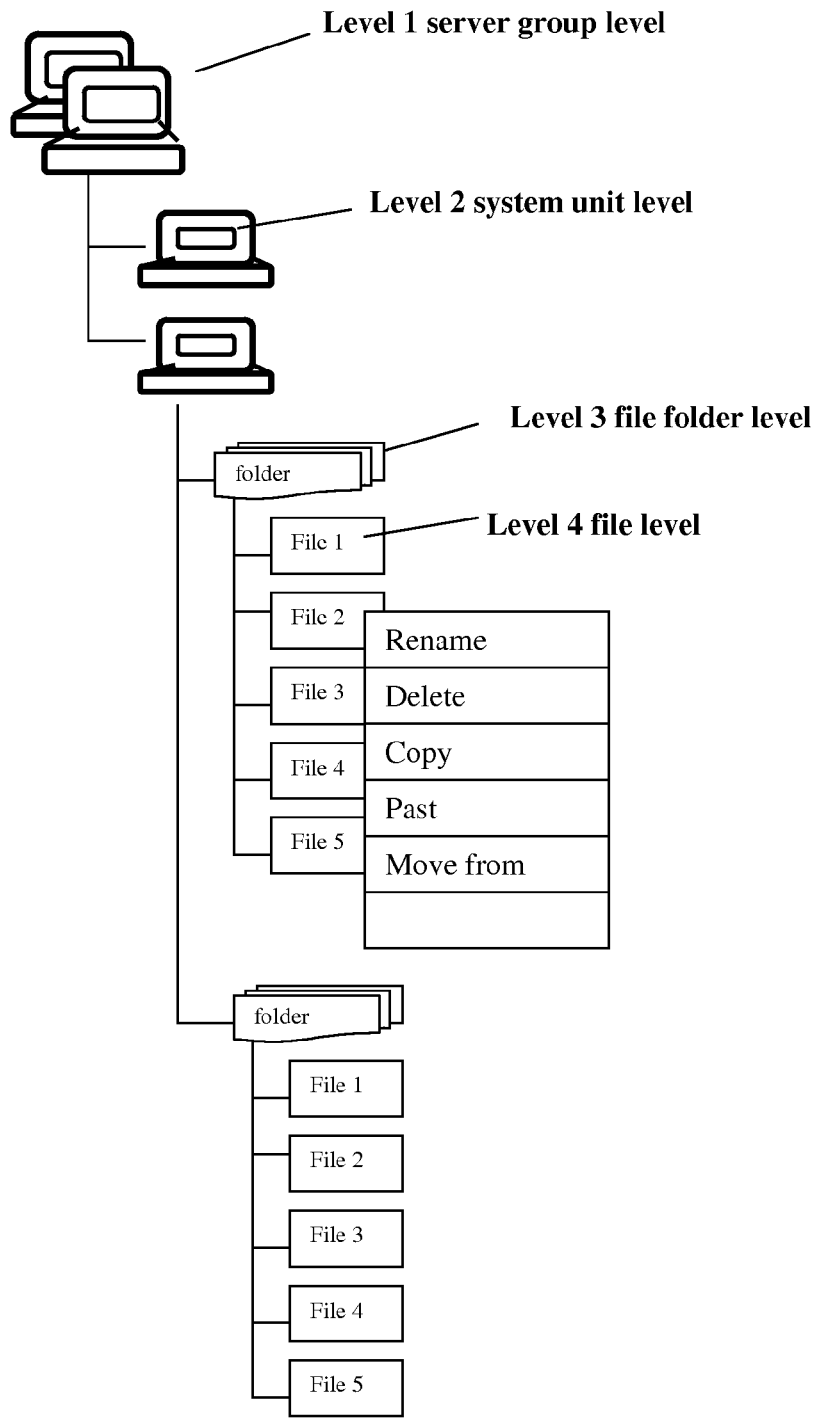
FIG. 8: illustrates the examples of the MLIL combined with mixed devices, system units and groups.

FIG. 8 illustrates the simplified examples of the MLIL that contains the combined mixed devices, system units and groups.

FIG. 8a) has illustrated an embodiment of a web MLIL, where the top level of the MLIL is a system group level node, the second level contains system unit level nodes, and the third level contains the disk device level nodes.

FIG. 8b) has illustrated an embodiment of a web MLIL, where the top level of the MLIL contains system group level node, the second level contains system unit level nodes, and the third level starts with the file folder level nodes, and the forth level is file level nodes.

Detailed Description of the Invention

The FIG. 1 will be used for most discussion, of the present invention and all reference number for designated elements are elements of FIG. 1 unless otherwise specified by other figure number. The FIG. 1 illustrates the web-based computer user work environment (WCUWE) of the CCDSVM provided by the software modules of the WCUWE FIG. 3, which includes console support software 6 & web server software 7 on the control management station 2 and service modules 8 on the system unit 3.

The WCUWE have been described in multiple places in the parent applications of the "Concurrent web based multi-task support for control management system" and the "IP based distributed virtual SAN". the WCUWE of the CCDSVM can be initiated by the software of WCUWE shown in FIG. 3 , especially by the console support software modules 6 of the control management station 2 need to perform the following:

First, the console support software 6 collects all major resources information of the control management station 2 together and further converts the collected information into the standard structured information, which can be displayed in the web-browser 9. The resources information mentioned above include the information of the storage, network, file system, files, folders, users, system status etc, without limits, which can be collected during the control management station 2 booting up or at other appropriate time. Said information may be stored in memory for fast retrieving at later time and may also be stored on permanent storage such as disks.

Second, the console support software 6 communicates with the service modules 8 of the system unit 3 to collect all major resources information from each system unit 3 through communication link net2. Further, the console support software 6 binds the collected information of the system units 3 to the network information list of the control management station 2. In addition, upon each users from a web browser 9 to request for accessing, said network information can be organized and converted into the standard structured format for web communication, therefore, they can be displayed and viewed from the web-browser 9. The network information include the information of the system units 3 and their storage device, network devices, wireless devices, video and audio record & playback devices, file-system, users, system status and all others on the network. The network information can be collected during each system units 3 booting up or at other appropriate time.

Further, the network information on the control management station 2 can be kept in memory for later fast accessing and can be organized into any suitable logical structure, for example as a simple list of array, linked list, double linked list, hash table, tree structure etc without limits. The network information also can be stored on permanent storage such as disk or others for the backup purpose. In addition, the network information can be stored in any form on the permanent storage, which can be the form of various commercial databases, binary record file, flat text ASCII file or others without limits. All exampled forms of data depository or logical structures mentioned above are for illustration only, and they shall not be limited in present invention.

After the final initiation of the WCUWE, the information of the WCUWE can be displayed in to each user's a web-browser 9 in response to the user log on the control system of the CCDSVM and can concurrently display, view, access, & operate various resources and information of the CCDSVM.

As described in the parent applications of the "Concurrent Web Based Multi-Task Support for Control Management System", one or more concurrent users from each of web browser 9 of the client system 10, or the console host 1, or control management station 2 can concurrently login to the CCSDVM via a login web page provided by the console support software modules 6 of the WCUWE (FIG. 3). The console support software modules 6 of the control system 2 (the control part of the WCUWE FIG. 3) presents (displays) information & the resources of the control management station 2 and the server units 3 into each user's web browser 9 in response to the user login from a web browser 9. Therefore, whenever an user from a web browser 9 requests to access or manage a resource on a targeted system of either the control management system 2 or any system unit 3 of the CCDSVM, the console support software modules 6 of the WCUWE (FIG. 3) create a corresponding user task for such request to be executed on the targeted systems. As de fact, the console support software modules 6 of the WCUWE (FIG. 3) control multiple simultaneous tasks transmitted from each web browser to be run in the user's a web-browser 9 without blocking the web browser screen and support multiple concurrent users from each of their own web-browser 9 to perform said tasks while provide best protecting for resources being accessed by multi-users.

In order to provide convenience for each users to perform tasks in the WCUWE after the user's login, the console support software 6 may deploy a logical structure of multi-layer item list ("MLIL") of FIG. 4 and the associated web based operation menu (FIG. 5) for corresponding actual multi-level organized resources. The resources, as mentioned before, could be the file folders of a file system, the system units 3 on the network, and/or the users and their security profile etc without limits. If there is need to create a structured multi-layer item list (MLIL) of the FIG. 4 for resources on a target systems at a time each login user tries to access and manage a related resource, the console support software 6 of the control management station 2 performs following:

First, for each sessions of the login users, a memory management module of the console support software 6 creates a MLIL as illustrated in FIG. 4 for a MLIL that represent one or more resources of the CCDSVM, the mirrored MLIL can be flexibly expanded or reduced on-the-flying along with the user's interacting, in one embodiment via mouse clicking. Actually, the console support software 6 maintains an association between each logical structure of MLIL and the corresponding actual targeted resources. The created mirrored MLIL can be reside in memory and can be in any form of the list structure such as a simple array list, link list, double link list, various tree structure, or hashed table, etc. without limits.

Second, for each node of each mirrored MLIL binds a corresponding graphic image and text representation to the node (item) on the list for the purpose of displaying, and further associates each nodes (items) with appropriate attributes, which shall reflect the nature of the actual resources such as name, type, level, size of a resource etc. without limits, therefore, the resources can be correctly displayed through MLIL in web browser 9.

Third, linking an operation menu to the mirrored MLIL. The operation menu can be either a web-based drop-down menu 1 of the FIG. 5 or a non-drop-down selective menu 2 of the FIG. 5.

Fourth, converting the mirrored MLIL and all its associated information into the standard structured information (web page) for web communication, which to be viewable and accessible from the web-browser 9. Therefore, the MLIL can be either viewed from a web-browser 9 on the control management station 2 or the client host 10 or the console host 1. The converted information of the logical item list (MLIL) needs to be transmitted via communication link net1 11 or net2 12 from the control management station 2 to the web browser 9. The converted logical item list (MLIL) can be transmitted using web protocol such as HTTP or any other suitable protocols, therefore, users can remotely view the displayed MLIL from web-browser 9.

Fifth, after user taking action for viewing or managing the resources represented by the displayed MLIL, the console support software 6 modifies the MLIL through said memory management module of the console support software 6. In addition, the memory management module of the console support software modules 6 keeps tracks of memory usage and status for each correspondent MLIL, because when user accessing or managing the resources represented by the displayed MLIL, it might result in expanding or reducing the nodes of the MLIL. For example, the operation of deleting a file folder requires to delete an actual file folder on a corresponding file system and delete the corresponding node on the MLIL in memory.

Most importantly, as a result, all processes or threads that are created to execute the tasks of accessing or managing the resources represented by the MLIL can effectively share the dynamically modified MLIL, which in facts provides a consistent view for the displayed MLIL in the web browser throughout the users' entire login session. The memory management module of the console support software modules 6 may need to translate and map the initial logical memory address of each MLIL to another logical memory address, therefore, the different processes or threads of the same user session can effectively access the same actual MLIL memory object for an user session, Sixth, the second to the fifth actions described above can be repeatedly processed as long as each user keeps working on a same resource information list represented by this MLIL.

Finally, for each users log out from the WCUWE of the CCDSVM, the created MLIL for a user session will be deleted through said memory management module of the console support software 6. Further, if a user stops to access the current related resources represented by a MLIL, and further requests to access a totally different resource that does not related to the current MLIL, the original MLIL may be deleted and a new MLIL will be created.

The accessing and managing file system always has been an important part of any computer user work environment (CUWE) in the past. Supporting a file system to be accessed by users from network has always being a challenge to many vendors. The parent applications of the "Concurrent web based multi-task support for control management system" and the "Distributed Virtual SAN" provide user from web browser 9 to manage storage volumes of the entire CCDSVM and further to create, manage, and access the file system on either control management station 2 or system unit 3. With a sophisticate method of using multi-layer item list of the FIG. 4 together with web operation menu of the FIG. 5 for the file systems in the WCUWE of the CCDSVM of the present invention, users can on-the-flying efficiently access and manage deeply nested files and folders in the file systems of the CCDSVM from web-browser 9 without caching any data.

With this method, the multi-layer item lists (MLIL) can be used to represent the actual file folder structure of a file system on any target system of the CCDSVM, where each item (node) represents a folder or a file system or a file. When user from web-browser 9 walk through the file system and use the mouse-clicking on the MLIL to operate a file or folder, only a small piece of information, which related to the file or folder, needs to be retrieved or transmitted between the targeted system of the CCDSVM and the control management station 2. For example, if a user wants to add or delete an item such as a folder, the only major information required to transmit is the file folder name from the control management system 2 to the targeted system and the targeted system shall carry out the task.

If a user wants to access an resource information node at a layer that bellows the current item node on a MLIL such as a folder, after sending folder name to the targeted system, the only information required to retrieve from the targeted system is a list of sub folders or file names if there is any under the current folder. If users want to set access permission for a file or a file-folder on any of targeted system for one or multiple users to access, the targeted system information and file or folder information located on the targeted system are required to be bound with each corresponding user's profile. The targeted systems could be either the control management station 2 or the system unit 3 of CCDSVM.

If users need to view or edit the content of a file on the system unit 3, the file may be transmitted via communication link over the net 1 & net 2 directly from the targeted system to the client system 10 or the console host 1 without going through the control management station 2. If the file is on the control management station 2 and users like to view or edit it from any remote system, the file is transmitted via communication link over the net1 to the client system 10 or the console host 1. With a proper viewing tool on the client system 10 or the console host 1 or the control management station that may be invoked from the web browser 9, the user is able to view the contents of the file. With a proper editor, user can further edit the file and then transmit the file back to the targeted system, which could be either the system unit 3 or the control management station 2.

Alternatively, the file may also be transmitted from the targeted system to the control management station 2 and further convert it from original format to a format, which may be viewed and edited in the web-browser. After converting, if the target system is not the control management station 2, the file can be transmitted via communication link net1 11 or net2 12 from the control management station 2 to the client system 10 or the console host 1 for viewing or editing within a web-browser 9. If the target system is the control management station 2 itself, there is no such transmission required.

Network information also is an important part of the WCUWE. Based on the parent applications of the "Concurrent Web Based Multi-Task Support for Control Management System" and the "IP based Distributed Virtual SAN", the control management system 2 controls the server units 3 of the CCDSVM to automatically and dynamically provision server units into multiple groups, which can be grouped based on the group ID of each server unit and each group contains at least one server unit 3 in present invention.

To effectively access and manage grouped system units 3 and their associated devices such as storage or network interface cards or terminal monitor or video & audio recorder such as camcorder, or keyboard & mouse, or wireless devices or file systems on network, the multi-layer item list (MLIL) also can be used. Therefore, the mixed information on the network can be ordered with top-down fashion, for example, the server-group is organized at top level, the system units 3 is placed at second level, and the devices or file system are organized starting from third level of a MLIL and so on without limits.

More specifically, a node on the MLIL with different level or type may associate with a different type of web operation menu. For example, a node of system unit 3 on the MLIL may associate with an operation menu containing operation options for system status, shutdown, storage management, change usage etc. and a node of storage device may associate with operation menu with operation options of creating storage volume, displaying storage volume, and delete storage volume etc. without limits.

Figure 9:
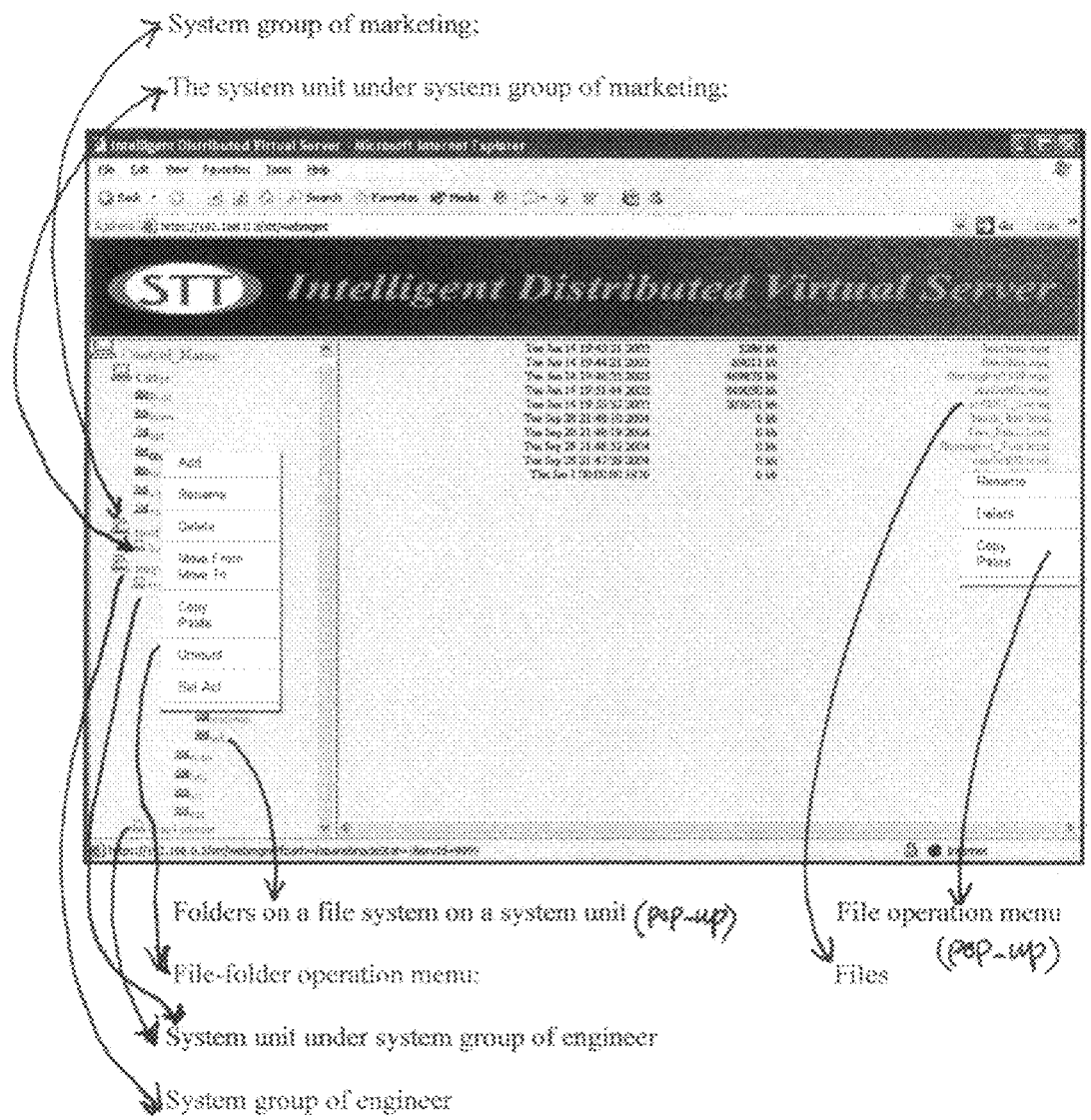
FIG. 9 illustrates how does the file systems of the CCDSVM to be accessed.
Figure 10:
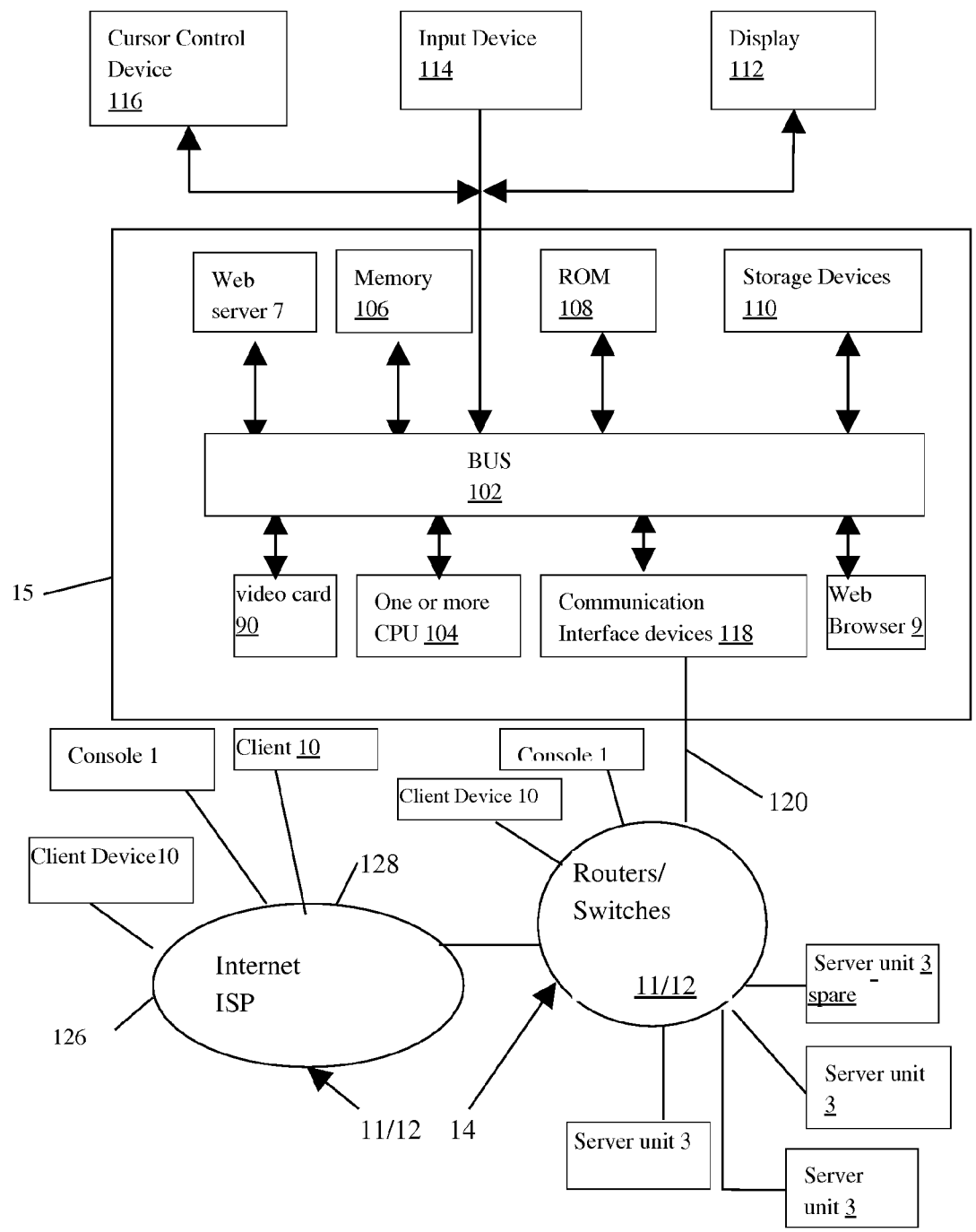
Figure 11E:
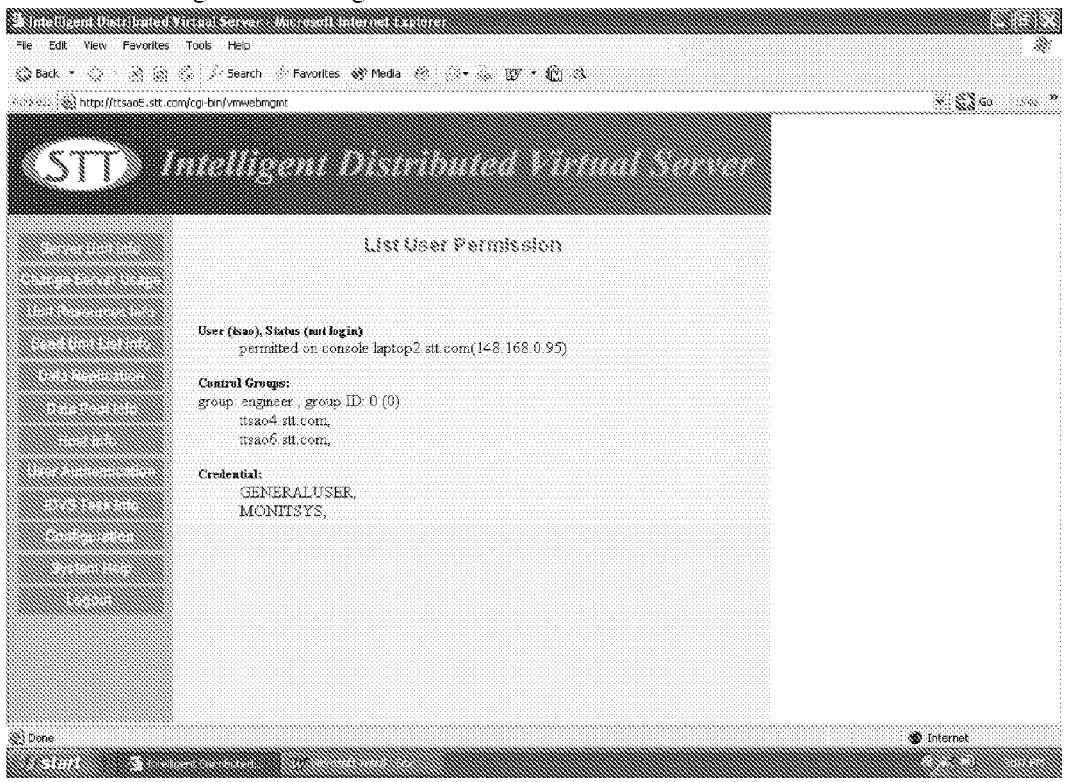
Figure 11F:
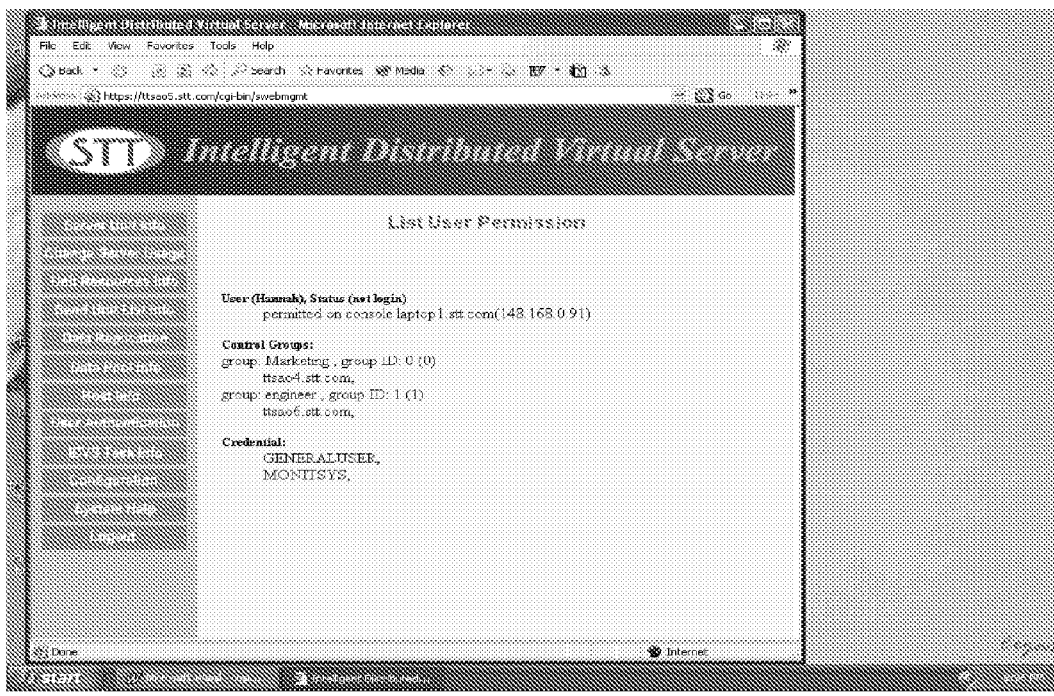

After converting all information associated with a MLIL to the standard structured information, the complex information on the network can be viewed and operated by users from web-browser 9. For example, the FIG. 7 has illustrated an example of how does system units 3 being provisioned into multiple groups. The FIG. 8 demonstrates an example of how does device such as storage can be listed under the server units 3 in each group. The FIG. 9 shows an example of how does the file system on the system unit 3 in a group can be accessed.

The method of automatically and dynamically grouping system units 3 and wisely using the MLIL to represent the diversified resources on the network, the entire CCDSVM can be much more efficiently accessed, operated, and managed. For example, through mouse clicking on web-browser 9, privileged users can create storage volumes from a fresh disk on any targeted system, make a file system on each created storage volume, mount the file system, create file-folder structure on the file system, and further setup access control for user with limited privileges. Therefore, the WCUWE can let user securely access from a web-browser 9 anywhere on the network.

The supporting user administration and authentication is also an important part of WCUWE of the CCDSVM. Initially, the WCUWE provides a default super user (first privileged user) to login the WCUWE of the CCDSVM and further to access the authentication web-page provided by the console support software 6. Therefore, the first privileged user can setup other privileged or non-privileged users' account profiles thereafter.

Similar to the file system in the WCUWE of the CCDSVM, the user profile also can be viewed and operated using a MLIL combined with a web-based operation menu illustrated in FIG. 5 and further be converted into the standard structured information, which can be viewed and accessed by users from the web-browser 9. Therefore, through mouse clicking on the MLIL of the user profile and the web-based operation menu in a displayed web page, users can conveniently perform tasks for creating the user account profile, for viewing, updating, or deleting user account profile and other tasks without limits. Specially, the privileged users can setup profiles for other non-privileged users for secure access control. In addition, the user information and their security profile can be kept in any form of a database, which could be a commercial database on the market, or a plaint text file, or a binary record file, and so forth without limits.

In present invention, the control system 2 can control automatically forming one or more service pools of a CCDSVM, where the service pools include storage and host pool. The host pool can be one of streaming video and audio service pool, file service pool, web service pool, database service pool, video monitoring service pool etc. without limit. The storage service pool of the CCDSVM can be one of SAN service pool or NAS service pool. In addition, each system in the host pool is capable of utilizing storage volumes in the storage pool. In one embodiment to use the storage volumes of SAN units to create local file systems of the host. In another embodiment, a database on a system in the host pool can be created on one or more storage volumes on the SAN units.

The automatic forming one or more service pools is realized through an automatic service pool construction protocol during each system's boot across a network which is one of LAN, WAN, Internet or corporate Intranet including corporate storage network. This protocol works as follow:

when a system unit 3 boot up or when a system's link up, it sends out a system up packet to the control system 2. The control system 2 automatically detecting and receive the packet sent by the system unit 3, collecting the identity information such as IP address and system's name from the packet, and then storing the collected information into a system information lists. The control system 2 then sends a reply packet to the system unit 3 for enquiring what service the system unit 3 will provide. The system unit 3 then sends a response packet including the required service information to the control system 2. After receiving the service information, the control system 2 updates the system information list which includes assigning each system into a corresponding service pool based on functionality of the system.

After the pooling process, the control system has obtained all necessary information for accepting service requests and distributing each request to a identified system in a corresponding service pool.

The present application also includes a method of solving a issue of the web browser being blocking and hanging by utilizing a user space task list along with a lock that provides protections for accessing the user space task list. Therefore, each user can submit and run one or more tasks from the user's a web browser for the targeted systems of the CCDSVM without blocking and hanging the web browser screen, where the targeted system can be the control system 2 or the system unit 3 of the CCDSVM. the method implemented in the console support software modules 6 of the control system 2 works as follow:

The console support software modules 6 of the control management station 2 repeatedly to perform receiving and parsing one or more requested task from each user's web browser, for each parsed task, it stores each task information into a not used slot in the user space task list, then runs each task into background and to be distributed and executed on the targeted systems of the CCDSVM. If the targeted system is a system unit 3, the control system 2 will get the task running status from the targeted system unit 2, if the targeted system is the control system itself, the console support 6 of the control system will provide the task status by itself. Next, the control system 2 provides a task status response web page back to the user who submitted the task, therefore, the user is capable of checking the status of each task that submitted by the user. In one embodiment, a response web page including a mechanism for allowing the user checking the status of a corresponding task in the user space task list. In another embodiment, the control system provides response web page including the status of failed or succeed.

That means after the user at a web browser submitted a task, the user will get a response web page immediately without waiting the completion of the task, consequently, user's web browser will never being blocked so that the user can submit another task regardless the previously submitted tasks are finished or not.

Actually, before said storing each task information into a not used slot in the user space task list, the thread of the console support 6 that performing the storing must acquire the lock that provides the protection for the user space task list, and the lock will be released after the task execution is started. The control management station 2 also may facilitate one or more locks to protect various other resources associated with each task during the task execution. Said each task's information stored in each corresponding slot of the user space task will be clean up when a corresponding task is finished to run. Also, each additional lock will be released along with the task execution up to the point of the task is completed.

The tasks can be performed by user from the web browser are compatible to those tasks can be run in native window based computer user work environment or in command line based user work environment. Said tasks include move or transmit data such as a multiple Gig-bytes data file or other data in various form from any point or any system to another point or another system within the CCDSVM; configure, partition and assign storage volumes to required systems within the CCDSVM; setup authentication of a specific user from a specific web browser with privilege to access or one or more systems within the CCDSVM; setup and authentication services of the CCDSVM for accessing by clients; monitor and display the status and activities of the network, storage, CPU, processes and threads for entire CCDSVM, and accessing and managing the file systems, file-folders and files of the CCDSVM etc. without limit.

As matter of the fact, the method of supporting multiple concurrent tasks for a single web browser without blocking the web browser screen is also applicable to other non-web based yet networked user interface ("UI").

The present application includes a layered structure for a larger scale of a CCDSVM which may comprise and controls hundreds or thousands systems. The layered CCDSVM comprise top level control system 2 and middle level control systems. The middle layer control system configured with the web server 7 and console support modules 6 that the same as the top control system has, and configured with the services modules 8 that are normally only being configured on the system unit 3. Therefore, the middle layer control system plays both role of the control management system to its underneath one or more system units and play the role of system unit to its up layer control system 2.

The present application also includes a security and authentication mechanism. The control system controls each user's security credentials and permissions for performing permitted tasks for the systems of the CCDSVM, accessing the permitted systems and resources of the CCDSVM either at control system 2 level or at system unit 3 level. The security permission also includes limiting each user only can from the user's specific system to access the CCDSVM, and assigning and permitting user accessing specific sized storage space.

The present invention has been described in considerable details with preference to certain preferred versions, examples, and figures; however, other versions, and samples are also possible. Therefore, the spirit and scope of the appended claims should not be limited to the description of the preferred versions and samples contained herein.

What is claimed is:

1. A virtual server providing web based multi-layered item lists accessing and managing resources, which comprises: one or more system units, each one-system unit having service agent providing web services,
   at least a console system having web browser for operating the virtual server,
   and a control system comprising
      multi-layered item lists ("MLIL") memories;
   wherein the control system controls the operations of the virtual server which includes automatically forming the virtual server with one or more service pools via communication to each system unit across a communication network, organizing resources information on the control system and from each system unit into one or more MLIL, and
   providing the web services and a web for UI displaying information of the virtual server including displaying in one or more MLIL;
   wherein the control system performs the following acts in response to each of one or more concurrent users from a web browser requests accessing the resources of the virtual server related to each specific MLIL:
   a) creating a mirrored MLIL object in memory with one or more resource nodes;
   b) encoding and including the mirrored MLIL in web UI to be vertically displayed into a user's web browser with one or more sub nodes, which are vertically aligned, right indented and displayed into one or more layers according to each node's level; and
   c) updating the mirrored MLIL in the memory and in the user's web browser by updating the web UI in response to the user's interaction with the MLIL, displayed to perform one or more tasks during the user's entire session; wherein the control system controls each web browser submitted one or more tasks to be run without blocking the web browser screen; and wherein each system unit receives, executes and responds to each requested task transmitted from the control system.

2. The virtual server of claim 1, wherein said act b) further comprises: organizing and displaying each node of the MLIL to represent a physical resource and each node's next layer of one or more sub nodes to represent a sub type of resource.

3. The virtual server of claim 1, wherein said act a) of creating a mirrored MLIL further comprises: binding each node of the mirrored MLIL with the resource's information including graphic image, web operation menu, and resource attributes, which including the name description, type, level and size.

4. The virtual server of claim 3, wherein said web operating menu further comprises: linking the same type of resource nodes of a mirrored MLIL with the same type of operation menu and different type of resource nodes of a mirrored MLIL with different type of operation menu in response to a resource operating requirement.

5. The virtual server of claim 1, wherein said act c) of updating mirrored MLIL further comprises: expanding a mirrored MLIL in memory by adding one or more nodes to represent one or more physical resources at a designated level of the MLIL, and displaying the updated MLIL in the user's web browser to include the expanded one or more nodes via an updated web UI, in response to the user's interaction that requires expanding the mirrored MLIL.

6. The virtual server of claim 5 also comprising reducing a mirrored MLIL in memory by deleting one or more nodes at one or more designated levels of the MLIL, and displaying the updated MLIL in the user's web browser that not includes the deleted nodes via an updated web UI in response to the user's interacting that requires reducing the mirrored MLIL.

7. the virtual server of claim 5 also comprising:
   for each mirrored MLIL, tracking the memory usage and the status, and translating logical memory address of a mirrored MLIL for each process/thread created during a user session, therefore, each process/thread of said user session consistently accesses the same instantly updated mirrored MLIL object in memory in response to the user's each interaction and requested task.

8. The virtual server of claim 1, wherein said act c) of updating mirrored MLIL further comprises:
   deleting a mirrored MLIL in memory in response to a corresponding user exiting from current user session or in response to the user accessing a resource that associated to another MLIL.

9. The virtual server of claim 1, wherein said each user from a web browser requests accessing the resources of the virtual server further comprises:
   displaying one or more said resources information including MLIL into each user's web browser via the web UI in response to the user logging onto the control system from a web browser on the user's local system and accessing said resources of the virtual server, wherein said user's local system is one of the control system, client system, console system, or system unit.

10. The virtual server of claim 9, wherein said accessing resources of the virtual server further comprises:
    facilitating said web UI for providing each user a web based user working operating environment regardless of whether the user from a web browser either on a remote system across world wide web or on the control system to log on the control system once and further access the resources of the virtual server.

11. The virtual server of claim 1, wherein said including a mirrored MLIL further comprises:
    including an encoded mirrored file-folder MLIL in a web UI to be displayed into a user's web browser in response to the user interactively accessing and managing the actual file-folder.

12. The virtual server of claim 11, wherein said accessing and managing the actual file-folder further comprises:
    permitting the user creating sub folders and accessing and managing files and folders via web operating menu options including renaming, deleting, adding (new), and moving files and file-folders.

13. The virtual server of claim 1, wherein said including a mirrored MLIL further comprises:
including an encoded mirrored MLIL in a web UI containing one or more file system nodes to be displayed into a user's web browser in response to the user interactively accessing each actual file system.

14. The virtual server of claim 1, wherein said including a mirrored MLIL further comprises:
including an encoded mirrored MLIL in a web UI containing one or more storage device nodes to be displayed into a user's web browser in response to the user interactively managing each actual storage device including its next layer one or more storage volumes.

15. The virtual server of claim 14 wherein said managing each storage device further comprises:
permitting the user to manage storage via web menu options including creating one or more storage volumes on each storage device; displaying, deleting, splitting, or combining storage volumes and creating a file system on corresponding storage volume.

16. The virtual server of claim 1, wherein said including a mirrored MLIL further comprises:
including an encoded mirrored MLIL in a web UI containing one or more hardware device nodes to be displayed into a user's web browser in response to the user accessing each actual hardware device of the virtual server which including network, wireless, CPU, and memory devices.

17. The virtual server of claim 1, wherein said including a mirrored MLIL further comprises:
including an encoded mirrored MLIL in a web UI containing one or more file nodes to be displayed into a user's web browser in response to the user interactively accessing and managing actual files which including data and application program files.

18. The virtual server of claim 1, wherein said including a mirrored MLIL further comprises:
including an encoded mirrored MLIL in a web UI containing one or more record nodes to be displayed into a user's web browser in response to the user accessing and managing records for a database of the virtual server which includes user security profile record.

19. The virtual server of claim 1, wherein said including a mirrored MLIL further comprises:
including an encoded mirrored MLIL in a web UI containing one or more message nodes to be displayed into a user's web browser in response to the user accessing and managing messages on the virtual server.

20. The virtual server of claim 1, wherein said including a mirrored MLIL further comprises:
including an encoded mirrored MLIL in a web UI containing one or more system unit nodes of a service pool to be displayed into a user's web browser in response to the user accessing each system unit including accessing its next layers' hardware and data resources.

21. The virtual server of claim 20, wherein said accessing each system unit further comprises:
permitting the user to manage each system unit via web menu options including monitoring status, reboot and shutdown each system unit, and managing each system unit's next one or more layers of resources including file systems, files, file-folders, and hardware devices.

22. The virtual server of claim 1, wherein said including a mirrored MLIL further comprises:
including an encoded mirrored MLIL in a web UI containing one or multiple service pool (group) nodes to be displayed into a user's web browser in response to the user accessing each service pool of the virtual server and accessing the service pool's next layer one or more system units, and each system unit's next multiple layers of said resources.

23. The virtual server of claim 1, wherein said providing user web based access further comprises:
facilitating a privileged user from web browser via the web UI to manage user account profiles including creating, listing, updating and deleting user profile, where each profile includes specified security attributes controlling each user's secure accessing to the virtual server.

24. The virtual server of claim 1, wherein said controlling each web browser submitted one or multiple tasks to be run without blocking the web browser screen further comprises:
configuring the control system of the virtual server to perform the following acts supporting web based multitasking including:
a) deploying a lock protecting a user space task list; and
b) repeatedly receiving and parsing one or more requested tasks from each user's web browser, and each parsed task performing acts of:
c) acquiring the lock that protecting the user space task list; storing the task information into a not used entry of the user space task list; then releasing the lock;
d) executing the task in background on the control system and to be distributed and executed on one or more targeted systems of the virtual server;
e) providing a response web page including the task's status back to the corresponding user's web browser without waiting the completion of the task; and
f) cleaning up the task information in the corresponding entry of the user space task list in response to the completion of the task.

25. The virtual server of claim 24, wherein said act e) of providing a response web page including the task status further comprises act:
obtaining the task status from the control system if the control system is a targeted system and obtaining status from each system unit if the system unit is a targeted system.

26. The virtual server of claim 24, wherein said act d) further comprises the act:
updating the MLIL structure and its corresponding mirrored MLIL in memory in response to the changes of a physical resource related to the MLIL during the task execution.

27. The virtual server of claim 24, wherein said providing a response web page including the task status further comprises:
facilitating the user from a web browser via said response web page to check the task status and perform one or more tasks regardless of whether the previously submitted one or more tasks are finished or not.

28. The virtual server of claim 1, wherein said control system further comprises:
configuring a computer system to function as the control system of said virtual server, wherein said computer system is one of server system, laptop system, desktop system, or personal wireless communication device which includes cell phone.

29. The virtual server of claim 1, wherein said automatically forming of the virtual server with one or more service pools further comprises:

automatically discovering and collecting identification and resources information from each system unit across said communication network to form the virtual server which includes assigning each system unit into a corresponding service pool (group) based on the functionality of the system unit, and storing the information of the virtual server into a list on the control system, wherein said communication network is one of corporate Intranet, Internet, LAN, or WAN.

30. The virtual server of claim 1, wherein said control system further comprises:

a control management controlling the operations of the virtual server which includes communicating to the service agent of each system unit to control each system unit across a communication network that includes automatically forming the virtual server with one or more service pools, organizing resources information on the control system and from each system unit into one or more MLIL, and distributing requested tasks to each targeted systems of the virtual server; and a web server interface operatively coupled to the control management providing web services and user interfaces ("UI") and transmitting and displaying information of the virtual server including the web UI, displaying the MLIL into each user's web browser, and receiving, distributing and executing each request transmitted from each web browser.

31. The virtual server of claim 30, wherein said system unit further comprises at least a network interface device and a storage device, and a service agent receiving, executing and responding to each requested task transmitted from the control system, and providing service to the requested one or more end users or client systems without going through the control system again and providing the service independent of other system units.

32. A control system providing web based multi-layered item lists accessing and managing resources, which comprises:

multi-layered item lists ("MLIL") memories;

the control system accessing the world wide web via a web browser, and organizing resources information on the control system and from a network into one or more MLIL, and providing web services and user interfaces ("UI") displaying information of the control system which including web UI of the MLIL; wherein the control system performs the following acts in response to each of one or more concurrent users from a web browser on the user's local system, requesting access to said resource information of the control system related to each specific MLIL:

a) creating a mirrored MLIL object in memory with one or more resource nodes;

b) encoding and including the mirrored MLIL in a web UI and vertically displayed into a user's web browser with one or more sub nodes, which are vertically aligned, right indented and displayed into one or more layers according to each node's level;

c) updating the mirrored MLIL in memory and updating the web UI for the web browser in response to the user's interacting to the displayed MLIL for performing one or more tasks during the user's entire session; and wherein the control system controls each web browser submitted one or more tasks to be run without blocking the web browser screen.

33. The control system of claim 32, wherein said act b) further comprises:

organizing and displaying each node of the MLIL representing a physical resource and each node's next layer of one or more sub nodes representing a sub type of resource.

34. The control system of claim 32, wherein said act a) of creating a mirrored MLIL further comprises:

binding each node of the mirrored MLIL with the actual resource's information including graphic image, web operation menu, and resource attributes which includes name description, type, level and size.

35. The control system of claim 34 further comprises:

linking same type of resource nodes of a mirrored MLIL with same type of operation menu and different type of resource nodes of a mirrored MLIL with different type of operation menu in response to resource operating requirement.

36. The control system of claim 32, wherein said act c) of updating mirrored MLIL during the user session further comprises act:

expanding a mirrored MLIL in memory by adding one or more nodes to represent one or more physical resources at a designated level of the MLIL, and displaying the updated MLIL in the user's web browser to include the expanded one or more nodes via an updated web UI in response to the user's interacting that requires expanding the mirrored MLIL.

37. The control system of claim 36 comprising act:

reducing a mirrored MLIL in memory by deleting one or more nodes at a designated level of the MLIL, and displaying the updated MLIL in the user's web browser that not includes the deleted nodes via an updated web UI in response to the user's interacting that requires reducing the mirrored MLIL.

38. the control system of claim 36 comprising act:

for each mirrored MLIL, tracking the memory usage and the status, and translating logical memory address of a mirrored MLIL for each process/thread created during a user session, therefore, each process/thread of said user session consistently accesses the same instantly updated mirrored MLIL object in memory in response to the user's each interaction and requested task.

39. The control system of claim 32, wherein said act c) of updating mirrored MLIL during the user session further comprises act:

deleting a mirrored MLIL in memory in response to a corresponding user's exiting from current user session or in response to the user starting accessing a resource that associated to another MLIL.

40. The control system of claim 32, wherein said each user from a web browser requests accessing said resources of the control system further comprises:

displaying one or more said resources information including displaying MLIL into each user's web browser via web UI in response to the user logging on from a web browser on the user's local system and accessing the control systems, wherein said local system is one of either the control system or a remote client system across world wide web.

41. The control system of claim 40, further comprising:

facilitating said web UI for providing each user a web based user working (operating) environment either on the control system or on a remote client system across world wide web to log on the control system and further via said web UI to perform said accessing the control system.

42. The control system of claim 32, wherein said including mirrored MLIL in web UI further comprises:
    including an encoded mirrored file-folder MLIL in web UI to be displayed into a user's web browser in response to the user interactively accessing and managing the actual file-folder.

43. The control system of claim 42, wherein said managing the actual file-folder further comprises:
    permitting the user to create sub folders and access and manage files and folders via menu options including renaming, deleting, adding, and moving files and folders.

44. The control system of claim 32, wherein said including mirrored MLIL in web UI further comprises:
    including an encoded mirrored MLIL in web UI containing one or more file system nodes to be displayed into a user's web browser in response to the user accessing and managing each actual file system.

45. The control system of claim 32, wherein said including mirrored MLIL in web UI further comprises:
    including an encoded mirrored MLIL in web UI containing one or more storage device nodes to be displayed into a user's web browser in response to the user accessing and managing each actual storage device including its next layer of one or more storage volumes.

46. The control system of claim 45 further comprising:
    facilitating the user to managie storage via menu options including creating one or more storage volumes on each storage device; displaying, deleting, splitting, or combining storage volumes and creating file system on the storage volume.

47. The control system of claim 32, wherein said including mirrored MLIL in web UI further comprises:
    including an encoded mirrored MLIL in web UI containing one or more hardware device nodes to be displayed into user's web browser in response to the user accessing, monitoring, and managing actual hardware devices including network, display, CPU, and memory devices.

48. The control system of claim 32, wherein said each of one or more concurrent users from a web browser requests accessing said resources of the control system further comprises:
    facilitating a privileged user from web browser via web UI to managing user account profiles including creating, listing, updating and deleting user profile, wherein said profile includes specified security permissions performing specific tasks, and accessing specific resources on the control system.

49. The control system of claim 32, wherein said each user from a web browser requests accessing said resources of the control system further comprises:
    configuring the control system to perform the following acts to support set access control:
    a) facilitating a privileged user from a web browser via the web UI to select a file object on the control system to submit a task, permitting a designated user to access the selected file object;
    b) receiving and parsing the task transmitted from said web browser;
    c) executing the task by storing the information of the file object into the designated user's security profile; and
    d) repeating the above acts beginning at act a) assigning and permitting each designated user accessing one or more file objects, wherein said file object is one of a file or file-folder.

50. The control system of claim 49, wherein said set access control further comprises:
    facilitating the privileged user performing the tasks of permitting one or more users accessing a same file.

51. The control system of claim 49, wherein said set access control further comprises:
    Facilitating the privileged user performing the task of permitting one or more users accessing a same file-folder.

52. The control system of claim 32, wherein said each user from a web browser requests accessing said resources of the control system further comprises:
    validating each user's secure access to one or more files and file-folders only based on security attributes specified in the user security profile.

53. The control system of claim 32, wherein said each users from a web browser requests accessing said resources of the control system further comprises:
    facilitating the user from a web browser on the user's local system via said MLIL of the web UI to select one file at a time and further transferring the file from the control system into the web browser for viewing or editing.

54. The system of claim 53, wherein said editing file further comprises:
    providing said user to transmit the edited file from user's local system back to the control system.

55. The control system of claim 53, wherein said editing file further comprises:
    converting file from the original format to a viewable and editable format and displaying and viewing in the user's web browser.

56. The control system of claim 32, wherein said each user from a web browser requests accessing said resources of the control system further comprises:
    facilitating each user transferring files residing on the user's local system via web MLIL of web UI across a network into the storage on the control system.

57. The control system of claim 32, wherein said controls each web browser submitted one or more tasks to be run without blocking the web browser screen further comprises:
    configuring the control system to perform the following acts for supporting web based multi-tasking:
    a) deploying a lock protecting a user space task list; and
    b) repeatedly performing the receiving and parsing of one or more requested tasks from each user's web browser, and for each parsed task performing following acts:
    c) acquiring the lock that protecting the user space task list, storing the task information into a not used entry of the user space task list, then releasing the lock;
    d) executing the task in the background on the control system;
    e) providing a response web page including the task's status back to the user's web browser without waiting the completion of the task; and
    f) cleaning up the task information in the corresponding entry of the user space task list in response to the completion of the task.

58. The control system of claim 57, wherein said act e) of providing a response web page further comprises:
    facilitating the user from a web browser via said response web page to check the task status and perform one or more tasks regardless of whether the previously submitted one or more tasks are finished or not.

59. The control system of claim 57, wherein said act d) of distributing the task into background further comprises the act of:
    updating a MLIL structure and its corresponding mirrored MLIL in memory in response to the changing of a resource related to the MLIL during the task executing.

60. The system of claim 32, wherein said control system further comprises:

configuring a computer system to function as a said control system, wherein said computer system is one of server system, desktop system, laptop system, or wireless personal communication device.

61. The control system of claim 32 further comprises:

a control management controlling the user space operations of the control system which includes organizing resources information on the control system and from network into one or more MLIL, and a web server interface operatively coupled to the control management to provide web services and user interfaces ("UI") display information of the control system including display via MLIL, and for receiving and executing each request transmitted from each web browser.

* * * * *